US011584667B2

(12) United States Patent
Nakano et al.

(10) Patent No.: US 11,584,667 B2
(45) Date of Patent: Feb. 21, 2023

(54) ELECTROLYSIS VESSEL

(71) Applicant: TECH CORPORATION CO., LTD., Hiroshima (JP)

(72) Inventors: Yoshinori Nakano, Hiroshima (JP); Rikiya Oka, Hiroshima (JP); Kenichiro Nakabe, Hiroshima (JP)

(73) Assignee: TECH CORPORATION CO., LTD., Hiroshima (JP)

( * ) Notice: Subject to any disclaimer, the term of this patent is extended or adjusted under 35 U.S.C. 154(b) by 0 days.

(21) Appl. No.: 17/626,703

(22) PCT Filed: Aug. 18, 2020

(86) PCT No.: PCT/JP2020/031115
§ 371 (c)(1),
(2) Date: Jan. 12, 2022

(87) PCT Pub. No.: WO2021/033684
PCT Pub. Date: Feb. 25, 2021

(65) Prior Publication Data
US 2022/0289600 A1    Sep. 15, 2022

(30) Foreign Application Priority Data
Aug. 21, 2019   (JP) .............................. JP2019-150961

(51) Int. Cl.
*C02F 1/461*    (2006.01)
*C25B 9/60*    (2021.01)
(Continued)

(52) U.S. Cl.
CPC ........ *C02F 1/4618* (2013.01); *C02F 1/46109* (2013.01); *C25B 9/21* (2021.01);
(Continued)

(58) Field of Classification Search
CPC ................ C02F 1/46104; C02F 1/4618; C02F 2001/46185; C02F 2001/4619;
(Continued)

(56) References Cited

U.S. PATENT DOCUMENTS 6,258,225 B1    7/2001   Yamaoka

FOREIGN PATENT DOCUMENTS

| CN | 201990735 | 9/2011 |
| JP | 2004-8983 | 1/2004 |

(Continued)

OTHER PUBLICATIONS

International Search Report dated Oct. 20, 2020 in corresponding International Application No. PCT/JP2020/031115.

*Primary Examiner* — Salil Jain
(74) *Attorney, Agent, or Firm* — Wenderoth, Lind & Ponack, L.L.P.

(57) ABSTRACT

In a spacer of an intermediate chamber in an electrolysis vessel, a cathode-side hole that is arranged in a cathode-side grid and an anode-side hole that is arranged in an anode-side grid and is positioned side-by-side with the cathode-side hole with each other in a first direction are misaligned with each other in a second direction that is orthogonal to the first direction. The cathode-side grid and the anode-side grid guide an electrolytic solution flowing into the intermediate chamber from one side of the second direction toward the other side of the second direction while allowing the electrolytic solution to flow along a serpentine course in the first direction by alternately guiding the electrolytic solution to the cathode-side hole and the anode-side hole which are misaligned with each other in the second direction.

11 Claims, 13 Drawing Sheets

(51) Int. Cl.
*C25B 9/21* (2021.01)
*C25B 15/08* (2006.01)

(52) U.S. Cl.
CPC ............. *C25B 9/60* (2021.01); *C25B 15/08* (2013.01); *C02F 2201/005* (2013.01); *C02F 2201/4611* (2013.01); *C02F 2201/46115* (2013.01)

(58) Field of Classification Search
CPC ... C02F 2001/46195; C25B 9/19; C25B 9/21; C25B 9/23; C25B 9/60
See application file for complete search history.

(56) References Cited

FOREIGN PATENT DOCUMENTS

| | | | |
|---|---|---|---|
| JP | 2004008983 A | * | 1/2004 |
| JP | 2006-43707 | | 2/2006 |
| JP | 2006043707 A | * | 2/2006 |
| JP | 2007-190548 | | 8/2007 |
| JP | 2007190548 A | * | 8/2007 |
| JP | 2017-00305 | | 1/2017 |
| JP | 6139809 | | 5/2017 |
| TW | 201229321 | | 7/2012 |

\* cited by examiner

ELECTROLYSIS VESSEL

TECHNICAL FIELD

The present invention relates to a three-chamber electrolytic cell.

BACKGROUND ART

There is a known three-chamber electrolytic cell having an interior partitioned into a cathode chamber, an intermediate chamber, and an anode chamber (Patent Literature 1, for example). An electrolytic solution is supplied to the intermediate chamber, and raw water is supplied to the cathode chamber and the anode chamber. When electrolysis takes place in the intermediate chamber, cations are supplied from the intermediate chamber to the cathode chamber, and anions are supplied from the intermediate chamber to the anode chamber.

CITATION LIST

Patent Literature

Patent Literature 1: Japanese Patent No. 6,139,809

SUMMARY OF INVENTION

Technical Problem

To improve the efficiency of the electrolysis performed by a three-chamber electrolytic cell, it is required to improve the ion supply capability from the intermediate chamber to the cathode chamber and the anode chamber.

Solution to Problem

The present invention is summarized as follows:
(1) An electrolytic cell including a cathode chamber, an anode chamber, and an intermediate chamber between the cathode chamber and the anode chamber, wherein a spacer in the intermediate chamber includes a cathode-side grid and an anode-side grid arranged in a first direction in which the cathode and anode chambers face each other, cathode-side holes in the cathode-side grid and anode-side holes in the anode-side grid aligned with the cathode-side holes in the first direction are shifted from each other in a second direction perpendicular to the first direction, and the cathode-side grid and the anode-side grid guide an electrolytic solution flowing into the intermediate chamber from one side in the second direction to another side in the second direction by alternately guiding the electrolytic solution to the cathode-side holes and the anode-side holes, which are shifted in the second direction, while causing the electrolytic solution to meander in the first direction.
(2) An electrolytic cell including
  a cathode chamber,
  an anode chamber that faces the cathode chamber in a first direction,
  an intermediate chamber located between the cathode chamber and the anode chamber, and
  a spacer that is located in the intermediate chamber and includes a cathode-side grid having cathode-side holes and an anode-side grid having anode-side holes and aligned in the first direction with the cathode-side grid, wherein the cathode-side holes and the anode-side holes are arranged in the first direction and shifted in a second direction perpendicular to the first direction, and the cathode-side grid and the anode-side grid guide an electrolytic solution flowing into the intermediate chamber from one side in the second direction to another side in the second direction and cause the electrolytic solution to meander in the first direction by alternately guiding the electrolytic solution to the cathode-side holes and the anode-side holes, which are shifted in the second direction.
(3) The electrolytic cell described in (1) or (2), wherein the cathode-side holes each have a rectangular shape in a plan view, and wall sections of four sides of each of the cathode-side holes each have a mountain-like shape that tapers with distance toward the cathode chamber in a cross-sectional view, and the anode-side holes each have a rectangular shape in the plan view, and wall sections of four sides of each of the anode-side holes each have a mountain-like shape that tapers with distance toward the anode chamber in a cross-sectional view.
(4) The electrolytic cell described in any one of (1) to (3), wherein the cathode-side holes and the anode-side holes have the same length in the second direction and are arranged by the same number in the second direction, in the cathode-side grid, a first protrusion protrudes from an end on the one side in the second direction toward the one side, and a second protrusion different in length from the first protrusion protrudes from an end on the other side in the second direction toward the other side, and in the anode-side grid, a third protrusion having a length equal to the length of the second protrusion protrudes from an end on the one side in the second direction toward the one side, and a fourth protrusion having a length equal to the length of the second protrusion protrudes from an end on the other side in the second direction toward the other side.
(5) The electrolytic cell described in (4), wherein the cathode-side holes and the anode-side holes have the same length in a third direction perpendicular to the first and second directions and are arranged by the same number in the third direction, fifth protrusions having the same length protrude from opposite ends of the cathode-side grid in the third direction toward opposite sides in the third direction, sixth protrusions having a length equal to the length of the fifth protrusions protrude from opposite ends of the anode-side grid in the third direction toward opposite sides in the third direction, and the cathode-side holes and the anode-side holes arranged in the first direction are located in the same positions in the third direction.
(6) The electrolytic cell described in any one of (1) to (5), wherein a cation exchange membrane and a cushion having elasticity and water permeability are present between a cathode electrode in the cathode chamber and the cathode-side grid and sequentially arranged from a side facing the cathode electrode, and/or an anion exchange membrane and a cushion having elasticity and water permeability are present between an anode electrode in the anode chamber and the anode-side grid and sequentially arranged from a side facing the anode electrode.
(7) The electrolytic cell described in any one of (1) to (6), wherein a cushion having elasticity and water permeability is present between the cathode-side grid and the anode-side grid.

(8) The electrolytic cell described in any one of (1) to (7), further including an electrolytic solution circulator that sends the electrolytic solution to the intermediate chamber, recovers the electrolytic solution from the intermediate chamber, add an electrolyte to the electrolytic solution, and circulates a resultant electrolytic solution, wherein the electrolytic solution circulator includes a tank that stores the electrolytic solution recovered from the intermediate chamber, and a relief valve that is located in a channel which extends from the intermediate chamber to the tank and along which the electrolytic solution flows and operates when pressure of the electrolytic solution becomes higher than or equal to set pressure to lower the pressure of the electrolytic solution.

(9) The electrolytic cell described in (8), wherein the relief valve is located in a channel which extends from the intermediate chamber to the tank and along which the electrolytic solution flows.

(10) The electrolytic cell described in (5), wherein the first protrusion is provided at a wall section of each of the cathode-side holes, the wall section extending in the second direction, and extends in the second direction with respect to the wall section extending in the second direction, the third protrusion is provided at a wall section of each of the anode-side holes, the wall section extending in the second direction, and extends in the second direction with respect to the wall section extending in the second direction, the first protrusions and the third protrusions coincide with each other in a plan view, the second protrusion is provided at a wall section of each of the cathode-side holes, the wall section extending in the second direction, and extends in the second direction with respect to the wall section extending in the second direction, the fourth protrusion is provided at a wall section of each of the anode-side holes, the wall section extending in the second direction, and extends in the second direction with respect to the wall section extending in the second direction, the second protrusions and the fourth protrusions coincide with each other in the plan view, the electrolytic cell further includes a frame-shaped intermediate chamber frame that accommodates the cathode-side grid and the anode-side grid, in the intermediate chamber frame, an inner wall section on the one side in the second direction has a supply groove that extends in the third direction and communicates with an acceptance port of the intermediate chamber frame via which the electrolytic solution is accepted, the electrolytic solution is supplied via the supply groove to spaces between a set of the first and third protrusions that coincide with each other in the plan view and a set of the first and third protrusions that are adjacent to the set in the third direction and coincide with each other in the plan view, in the intermediate chamber frame, an inner wall section on the other side in the second direction has a discharge groove that extends in the third direction and communicates with a discharge port of the intermediate chamber frame via which the electrolytic solution is discharged, and the electrolytic solution is discharged to the discharge groove from spaces between a set of the second and fourth protrusions that coincide with each other in the plan view and a set of the second and fourth protrusions that are adjacent to the set in the third direction and coincide with each other in the plan view.

(11) The electrolytic cell described in (10), wherein an orifice is present in a channel that connects the discharge groove to the discharge port.

(12) The electrolytic cell described in any one of (1) to (9), further comprising an intermediate chamber frame, which is a frame-shaped chamber and has an interior partitioned in the second direction by a partition extending in a third direction perpendicular to the first and second directions, the intermediate chamber frame including accommodation spaces arranged in the second direction, wherein the accommodation spaces each accommodate the spacer.

(13) The electrolytic cell described in (5), wherein the first protrusion is formed of a plurality of first protrusions, and the first protrusions extend in the second direction with respect to wall sections of the cathode-side holes, the wall sections extending in the second direction, the third protrusion is formed of a plurality of third protrusions, and the third protrusions extend in the second direction with respect to wall sections of the anode-side holes, the wall section extending in the second direction, the first protrusions and the third protrusions are located in different positions in the third direction, the electrolytic cell further comprises a frame-shaped intermediate chamber frame that accommodates the cathode-side grid and the anode-side grid, in the intermediate chamber frame, an inner wall section on the one side in the second direction has a supply port via which the electrolytic solution is supplied, and the electrolytic solution supplied via the supply port spreads in the third direction while draining between gaps between the first and third protrusions on the one side of the cathode-side grid and the anode-side grid.

Advantageous Effects of Invention

In the electrolytic cell according to the present invention, the spacer includes the cathode-side grid and the anode-side grid arranged in the first direction, in which the cathode and anode chambers face each other, and guides the electrolytic solution flowing into the intermediate chamber from one side in the second direction perpendicular to the first direction to the other in the second direction. The cathode-side holes in the cathode-side grid and the anode-side holes in the anode-side grid are aligned with each other in the first direction but shifted from each other in the second direction. Therefore, in the present invention, the cathode-side holes and the anode-side holes can guide the electrolytic solution, which flows into the intermediate chamber, along the second direction while causing the electrolytic solution to meander in the first direction, whereby the electrolytic solution can be agitated. The present invention can therefore improve the ion supply capability from the intermediate chamber to the cathode and anode chambers.

DESCRIPTION OF EMBODIMENT

Figure 1:
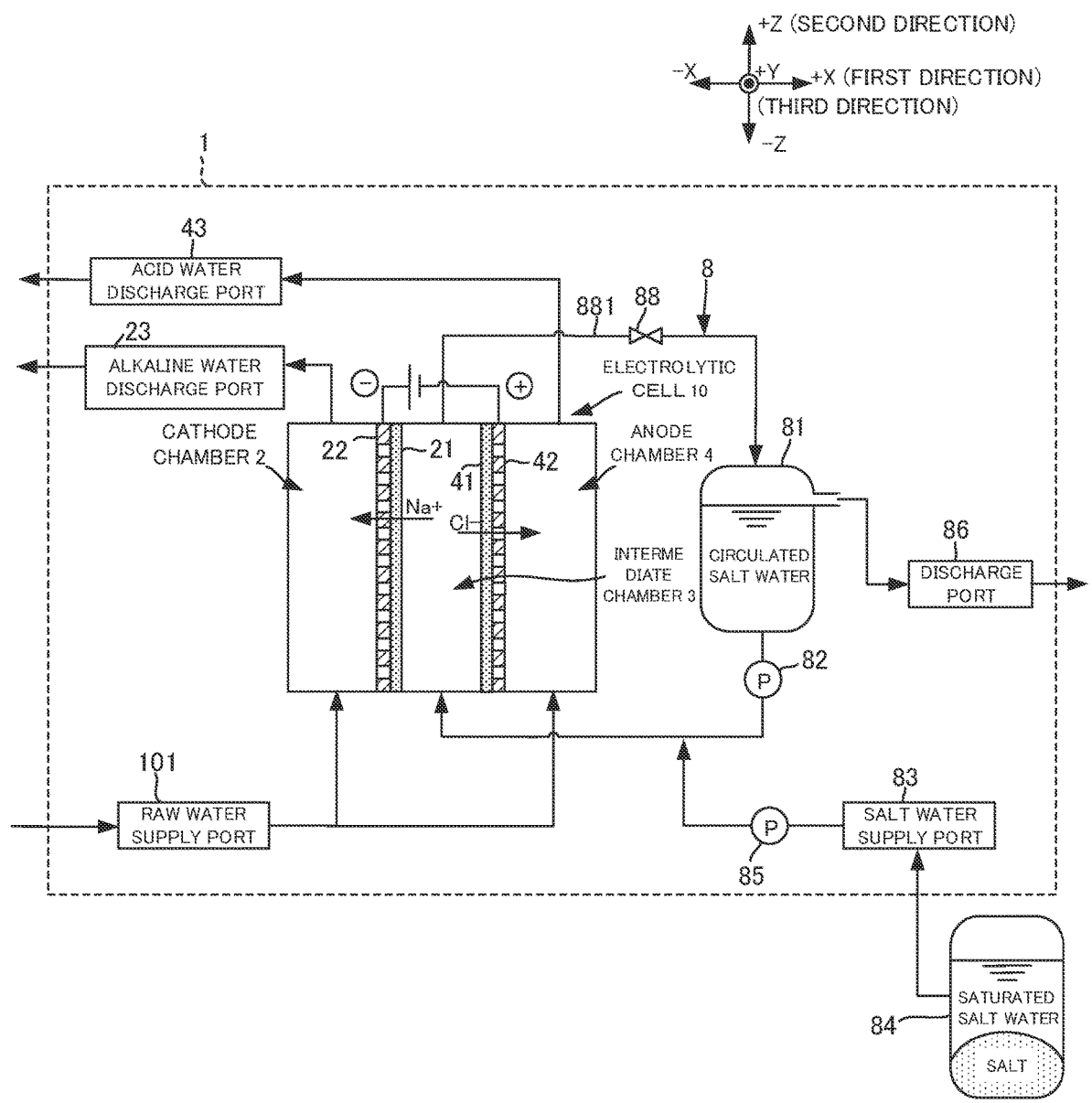
FIG. 1 is a schematic view of an electrolyzed water generator 1 in a first embodiment.

Embodiments will be described below with reference to the drawings.

The present embodiment relates to electrolytic cell 10 and 10A including a cathode chamber 2;

an anode chamber 4, which faces the cathode chamber 2 in a first direction (direction X);

an intermediate chamber 3 between the cathode chamber 2 and the anode chamber 4; and spacers 5 and 5A, which are located in the intermediate chamber 3 and include cathode-side grids 51 and 51A having cathode-side holes 511 and anode-side grids 52 and 52A having anode-side holes 521 and aligned in the first direction with the cathode-side grids 51 and 51A.

wherein the cathode-side holes 511 and the anode-side holes 521 are arranged in the first direction and shifted in a second direction (direction Z) perpendicular to the first direction, and the cathode-side grids 51 and 51A and the anode-side grids 52 and 52A guide the electrolytic solution flowing into the intermediate chamber 3 from one side in the second direction (direction −Z) to the other side in the second direction (direction +Z) and cause the electrolytic solution to meander in the first direction by guiding the electrolytic solution alternately to the cathode-side holes 511 and the anode-side holes 521, which are shifted in the second direction.

(Overall Configuration of Electrolyzed Water Generator 1)

FIG. 1 is a schematic view of an electrolyzed water generator 1.

The electrolytic cell 10 of the electrolyzed water generator 1 (hereinafter referred to as "generator 1") is a three-chamber generator having an interior partitioned into the cathode chamber 2, the intermediate chamber 3, and the anode chamber 4. The cathode chamber 2 is located in a left portion of FIG. 1, and the anode chamber 4 is located in a right portion of FIG. 1. The intermediate chamber 3 is located between the cathode chamber 2 and the anode chamber 4.

The direction in which the cathode chamber 2 and anode chamber 4 face each other is the direction ±X (first direction), with the direction toward the side facing the cathode chamber 2 being the direction −X, and the direction toward the side facing the anode chamber 4 being the direction +X. It is assumed in the present embodiment that the direction X is the horizontal direction. It is, however, noted that the electrolytic cell 10 may be used in any orientation, and that the direction X is not necessarily the horizontal direction. In the present embodiment, the upward-downward direction perpendicular to the direction X is the direction ±Z (second direction). The vertical direction in the plane of view of FIG. 1, which is perpendicular to the directions X and Z, is direction ±Y (third direction). Salt water is supplied with from an electrolytic solution circulator 8, which will be described later, to the intermediate chamber 3. NaCl dissolves in the salt water at a high concentration. The salt water may be replaced with any other electrolyte solution in which any other electrolyte dissolves, such as sodium carbonate, sodium hydrogen carbonate, hydrochloric acid, potassium chloride, calcium chloride, and a mixture thereof. The salt water is supplied via the −Z-direction-side of the intermediate chamber 3 and discharged via the +Z-direction-side thereof.

The cathode chamber 2 and the intermediate chamber 3 are separated by a cation exchange membrane 21. The cation exchange membrane 21 selectively transmits cations Nat. A cathode electrode 22 is located on the rear side (−X-direction side) of the cation exchange membrane 21.

The anode chamber 4 and the intermediate chamber 3 are separated by an anion exchange membrane 41. The anion exchange membrane 41 selectively transmits anions Cl⁻. An anode electrode 42 is located on the rear side (+X-direction side) of the anion exchange membrane 41. Raw water is supplied to the cathode chamber 2 and the anode chamber 4 via a raw water supply port 101 through an external pipe connected to the raw water supply port 101. Tap water, reverse osmosis (RO) water, or any other suitable water can be used as the raw water. A small amount of electrolytes may dissolve in the raw water, for example, at a concentration of 15 ppm or lower. The raw water is supplied via the −Z-direction-side of the cathode chamber 2 and the anode chamber 4 and discharged via the +Z-direction-side thereof.

The generator 1 applies a DC voltage to the cathode electrode 22 and the anode electrode 42 when performing the electrolysis. The Na⁺ in the intermediate chamber 3 moves from the intermediate chamber 3 to the cathode chamber 2 and dissolves in the raw water in the cathode chamber 2. The cathode chamber 2 produces alkaline water that is the raw water in which Na⁺ has dissolved. The alkaline water is called in other words alkaline electrolyzed water. The alkaline water is sent from the cathode chamber 2 through an alkaline water discharge port 23 to an external pipe connected to the discharge port 23.

During the electrolysis, Cl⁻ in the intermediate chamber 3 moves from the intermediate chamber 3 to the anode chamber 4 and dissolves in the raw water. The anode chamber 4 produces acid water that is the raw water in which Cl⁻ has dissolved. The acid water is called in other words acid electrolyzed water. The acid water is sent via an acid water discharge port 43 to an external pipe connected to the discharge port 43.

The salt water sent to the intermediate chamber 3 is electrolyzed so that the salt concentration of the salt water decreases. The electrolytic solution circulator 8 therefore sends the salt water to the intermediate chamber 3, recovers the salt water from the intermediate chamber 3, adds saturated salt water to the recovered salt water, and circulates the resultant salt water. The electrolytic solution circulator 8 stores the salt water recovered from the intermediate chamber 3 in a circulation tank 81 and sends the salt water in the circulation tank 81 to the intermediate chamber 3 with a pump 82.

The electrolytic solution circulator 8 mixes saturated salt water with the recovered salt water to cause the recovered salt water to return to substantially saturated salt water and sends the resultant salt water to the intermediate chamber 3. The saturated salt water is supplied from an external tank 84. The external tank 84 is connected to a salt water supply port 83 of the generator 1 via an external pipe. The external tank 84 is configured to allow water to flow therethrough in the presence of undissolved salt and supplies saturated salt water. The generator 1 drives a pump 85 to send saturated salt water from the external tank 84 to the downstream stage of the circulation tank 81 in the salt water circulation system.

The circulation tank 81 is an overflow tank from which the flow-in salt water is discharged out of the tank when the water level reaches a set value. The action of the electrolytic solution circulator 8 and steady operation of the pump 82 help maintain fixed water pressure acting on the intermediate chamber 3. The salt water discharged from the circulation tank 81 is sent to an external pipe via a discharge port 86, to which the external pipe is connected.

A relief valve 88 is located in a salt-water-recovering channel 881 extending from the intermediate chamber 3 into the circulation tank 81. The relief valve 88 is automatically activated when the flow pressure of the salt water reaches or exceeds a set value and opens the valve therein to discharge the salt water through the channel 881 so as to lower the flow pressure of the salt water. The relief valve 88 automatically closes the valve to stop discharging the salt water when the flow pressure of the salt water becomes smaller than the set value in the state in which the valve is open.

The valve 88, the pumps 82 and 85, the electrodes 22, 42, and other elements may be configured to be driven under the control of a controller or may be manually driven.

(Overall Configuration of Electrolytic Cell 10)

Figure 2:
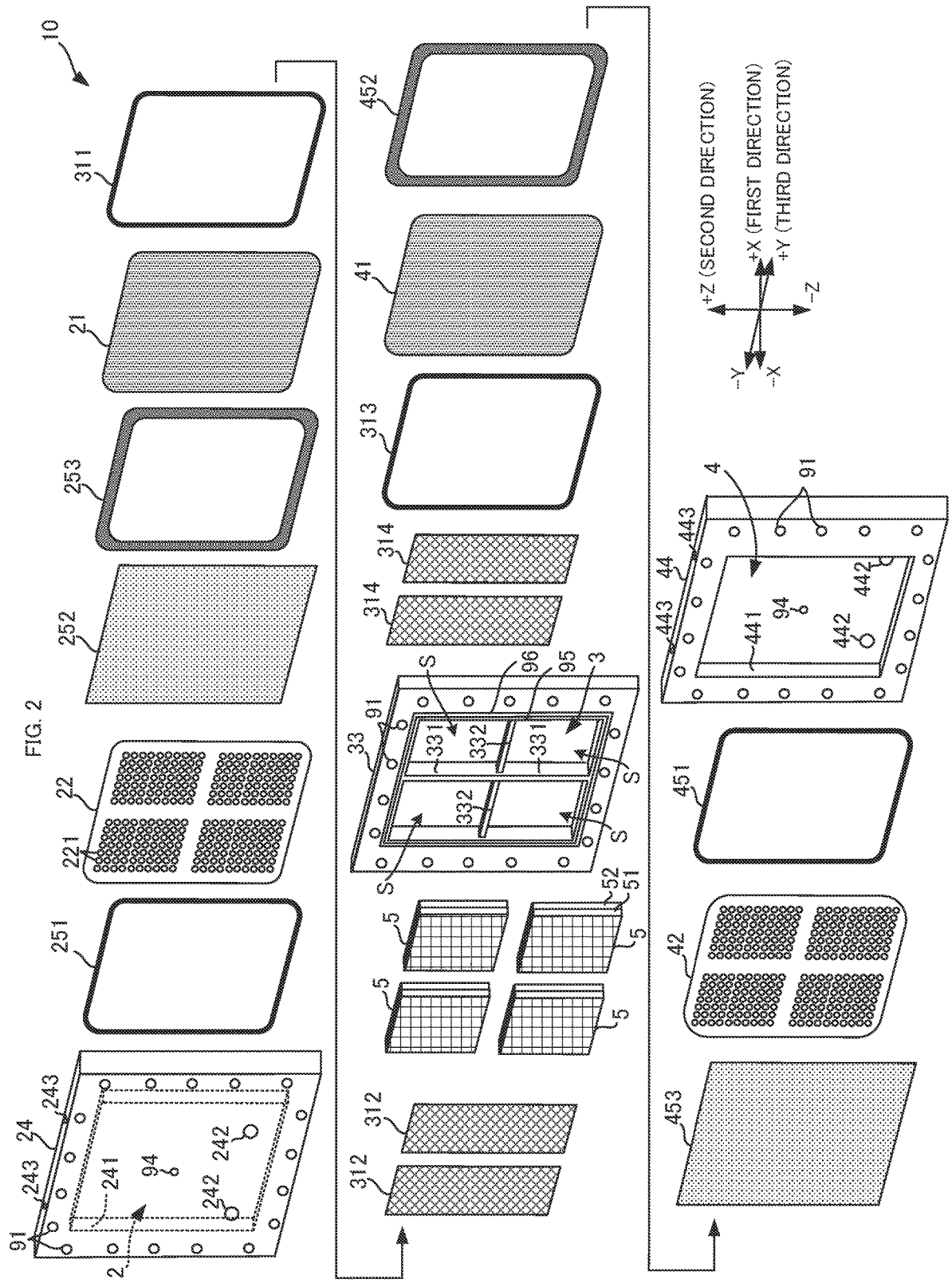
FIG. 2 is an exploded perspective view of an electrolytic cell 10.

FIG. 2 is an exploded perspective view of the electrolytic cell 10.

The electrolytic cell 10 includes as enclosures a cathode chamber frame 24, an intermediate chamber frame 33, and an anode chamber frame 44. The frames 24, 33, and 44 each have a rectangular shape elongated in the direction Z in the plan view and have roughly the same size. Edge portions of the frames 24, 33, and 44 each have a plurality of holes 91. Bolts 92 (FIG. 9) are caused to pass through the holes 91 to position the frames 24, 33, and 44. A plurality of elements are disposed between the frames 24, 33, and 44. Spacers 5, which will be described later, are disposed in the intermediate chamber frame 33. In this state, the bolts 92 passing through the respective holes 91 are tightened with nuts 93 (FIG. 9) to fasten the frames 24, 33, 44.

In more detail, during the assembly of the electrolytic cell 10, the bolts 92 are caused to pass through the respective holes 91 in the frame portion of the cathode chamber frame 24, and the cathode chamber frame 24 is laid on a horizontal jig so that a hole 241, which will be described later, faces upward. In this state, after the elements and frames 33 and 44 are stacked on the cathode chamber frame 24, the bolts 92 are tightened with the nuts 93.

Figure 9:
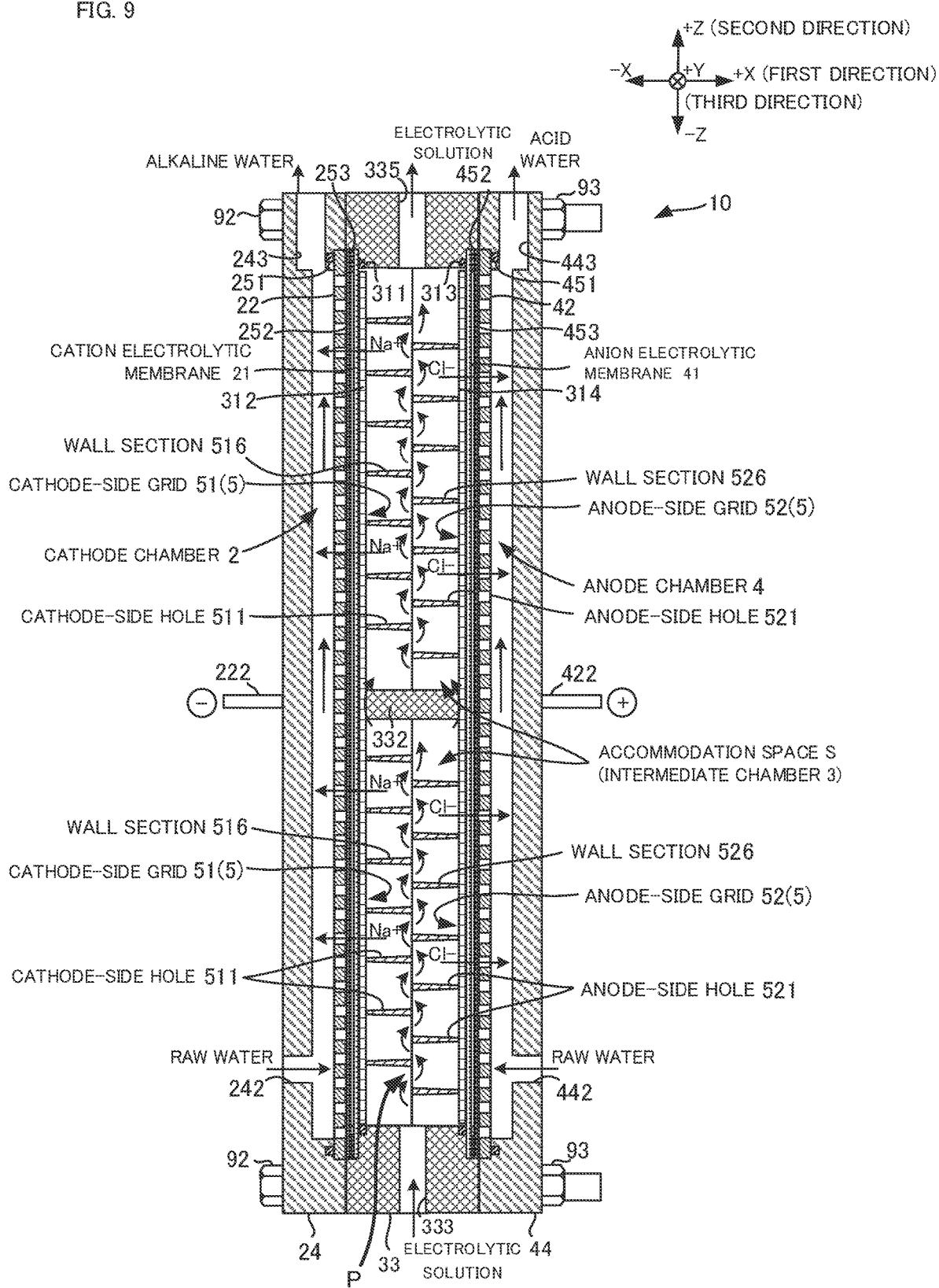
FIG. 9 is a cross-sectional view of the electrolytic cell 10.

The frames 24, 33, and 44 and the elements will be briefly described below. Refer to FIG. 9, which also shows the elements, as appropriate.

The cathode chamber frame 24 has the same configuration as that of the anode chamber frame 44 but reversed in the direction X, and the hole 241 of the cathode chamber frame 24 has a rectangular shape in the plan view and forms the cathode chamber 2. A hole 94 is present in a central portion of the bottom of the hole 241, and a wiring member 222 (FIG. 9) connected to the cathode electrode 22 passes through the hole 94. Holes 242, via which the raw water is supplied to the cathode chamber 2, are located in a −Z-direction-side portion of the bottom of the hole 241 and separate from each other in the direction Y. The holes 242 are connected to the raw water supply port 101 via a union or any other joint and a pipe. Holes 243 are located in the +Z-direction-side surface of the cathode chamber frame 24 and separate from each other in the direction Y. The holes 243 are connected to the alkaline water discharge port 23 via a union or any other joint and a pipe, and the alkaline water is discharged from the cathode chamber 2 via the holes 243.

Similarly, the anode chamber frame 44 has a hole 441, which has a rectangular shape in the plan view and forms the anode chamber 4. A hole 94 is present in a central portion of the bottom of the hole 441, and a wiring member 422 (FIG. 9) connected to the anode electrode 42 passes through the hole 94. Holes 442 are located in a −Z-direction-side portion of the bottom of the hole 441 and separate from each other in the direction Y. The holes 442 are connected to the raw water supply port 101, and the raw water is supplied to the anode chamber 4 via the holes 442. Holes 443 are located in a +Z-direction-side surface of the anode chamber frame 44 and separate from each other in the direction Y. The holes 443 are connected to the acid water discharge port 43 via a union or any other joint and a pipe, and the acid water is discharged from the anode chamber 4 via the holes 443.

The cathode electrode 22 is placed on the +X-direction side of the cathode chamber frame 24 via an annular gasket 251. The cathode electrode 22 has a roughly rectangular shape and cover the hole 241 of the cathode chamber frame 24. The cathode electrode 22 has a plurality of holes 221 located so as not to overlap with partitions 331 and 332, which will be described later, in the intermediate chamber frame 33. The cathode electrode 22 is accommodated in an annular first groove around the hole 241 and in turn accommodated in the cathode chamber frame 24 (see FIG. 9). The gasket 251 is also accommodated in an annular second groove located around the hole 241 and formed in the first groove and in turn accommodated in the cathode chamber frame 24 (see FIG. 9). Also in the anode chamber frame 44, similar first and second grooves are located around the hole 441 to accommodate a gasket 451 and the anode electrode 42, but the first and second grooves are omitted in FIG. 2.

A fluorine mesh sheet 252, an annular, sheet-shaped gasket 253, the cation exchange membrane 21, and an annular gasket 311 are sequentially arranged in the direction +X on the cathode electrode 22. Annular, continuous first step 95 and second step 96 are formed at a surface of the intermediate chamber frame 33 that is the surface facing the cathode chamber frame 24 and face the center of the surface. The gasket 311 is accommodated in the first step 95 on the side facing the center (see also FIG. 9). The elements 252, 253, and 21 are stacked on each other and accommodated in the second step 96 on the side facing the exterior of the surface (see also FIG. 9).

The fluorine mesh sheet 252 is a nonwoven fabric having roughly the same shape as that of the cathode electrode 22 and made of fluorine fibers. The gasket 311 is sandwiched between an edge portion of the cation exchange membrane 21 and the intermediate chamber frame 33. The elements 251, 22, 252, 253, 21, and 311 described above are sandwiched between frames 24 and 33. Edge portions of the elements 22, 252, and 21 are sandwiched between the frames 24 and 33. The gaskets 251 and 311 are made of a material that withstands alkaline water, such as ethylene-propylene rubber (EPDM).

The cathode electrode 22 closes the hole 241 of the cathode chamber frame 24, so that the cathode chamber 2 is formed between the cathode electrode 22 and the cathode chamber frame 24.

The intermediate chamber frame 33 can accommodate a plurality of spacers 5 at least in the direction Z. In the present embodiment, the intermediate chamber frame 33 accommodates two spacers 5 in the direction Z in each of two positions separated from each other in the direction Y. The intermediate chamber frame 33 is a frame-shaped chamber and faces in the direction X the frame-shaped portion around the hole 241 of the cathode chamber frame 24. In the intermediate chamber frame 33, the partition 331 is located at the center in the direction Y and extends to the Z-direction opposite ends of the intermediate chamber frame 33. The partition 331 is flush with the bottom of the first step 95. The partition 332 is located at the center in the direction Z and extends to the Y-direction opposite ends of the intermediate chamber frame 33. The partition 332 is slightly, for example, by 2 mm, lower (closer to +X side) than the bottom surface of the first step 95 so that net-shaped cushions 312, which will be described later, are accommodated between the spacers 5 and the cation exchange membrane 21. The partitions 331 and 332 intersect with each other and are disposed in the form of a cross in the intermediate chamber frame 33. The partitions 331 and 332 partition the interior of the intermediate chamber frame 33 into four portions, forming four accommodation spaces S.

The spacers 5 are placed in the respective accommodation spaces S. It is now noted that the water pressure in the anode chamber 2 and the water pressure in the cathode chamber 4 are set to be higher than the water pressure in the intermediate chamber 3. The ion exchange membranes 21 and 41 are therefore pressed toward the intermediate chamber 3 due to the difference in water pressure. In this situation, the spacers 5 suppress deformation of the ion exchange membranes 21 and 41 toward the intermediate chamber 3. The spacers 5 are configured to allow the salt water to pass through the interior thereof so as not to prevent the movement of the ions from the intermediate chamber 3 to the cathode chamber 2 and the anode chamber 4. The spacers 5 each include the cathode-side grid 51, which is located on the side facing the cathode chamber 2, and the anode-side grid 52, which is juxtaposed in the direction X with the cathode-side grid 51 and located on the side facing the anode chamber 4. The grids 51 and 52 have the same thickness in the direction X that is roughly half the thickness of the partition 332 in the direction X.

The net-shaped cushions 312 are disposed between the spacers 5 and the cation exchange membrane 21. One net-shaped cushion 312 is disposed in correspondence with the spacers 5 arranged in the direction Z, and two net-shaped cushions 312 are disposed in the present embodiment. The net-shaped cushions 312 are located between the cation exchange membrane 21 and the spacers 5 and inside the gasket 311. The net-shaped cushions 312, the intermediate chamber frame 33, and the spacers 5 will be further described later.

Net-shaped cushions 314, the gasket 313, the anion exchange membrane 41, a gasket 452, a fluorine mesh sheet 453, the anode electrode 42, and the gasket 451 are sequentially arranged from the side facing the intermediate chamber frame 33 between the intermediate chamber frame 33 and the anode chamber frame 44. The net-shaped cushions 314 are located between the anion exchange membrane 41 and the spacers 5 and inside the gasket 313. The elements 313, 41, 452, 453, 42, 451 excluding the net-shaped cushions 314 are sandwiched between the frames 33 and 44. Edge portions of the elements 41, 453, and 42 are sandwiched between the frames 33 and 44.

The elements 314, 313, 41, 452, 453, 42, and 451 between the intermediate chamber frame 33 and the anode chamber frame 44 have the same shapes as those of the elements 312, 311, 21, 253, 252, 22, and 251 between the intermediate chamber frame 33 and the cathode chamber frame 24. The elements 314, 452, 453, and 42 can be identical to the elements 312, 253, 252, and 22. The gaskets 313 and 451 are made of a material that withstands acid water, for example, fluororubber (FKM). The first and second steps 95 and 96 described above are also formed at a surface of the intermediate chamber frame 33 that is the surface facing the anode chamber frame 44, so that the elements 314, 313, 41, 452, and 453 can be accommodated in the intermediate chamber frame 33 (see FIG. 9).

Figure 3:
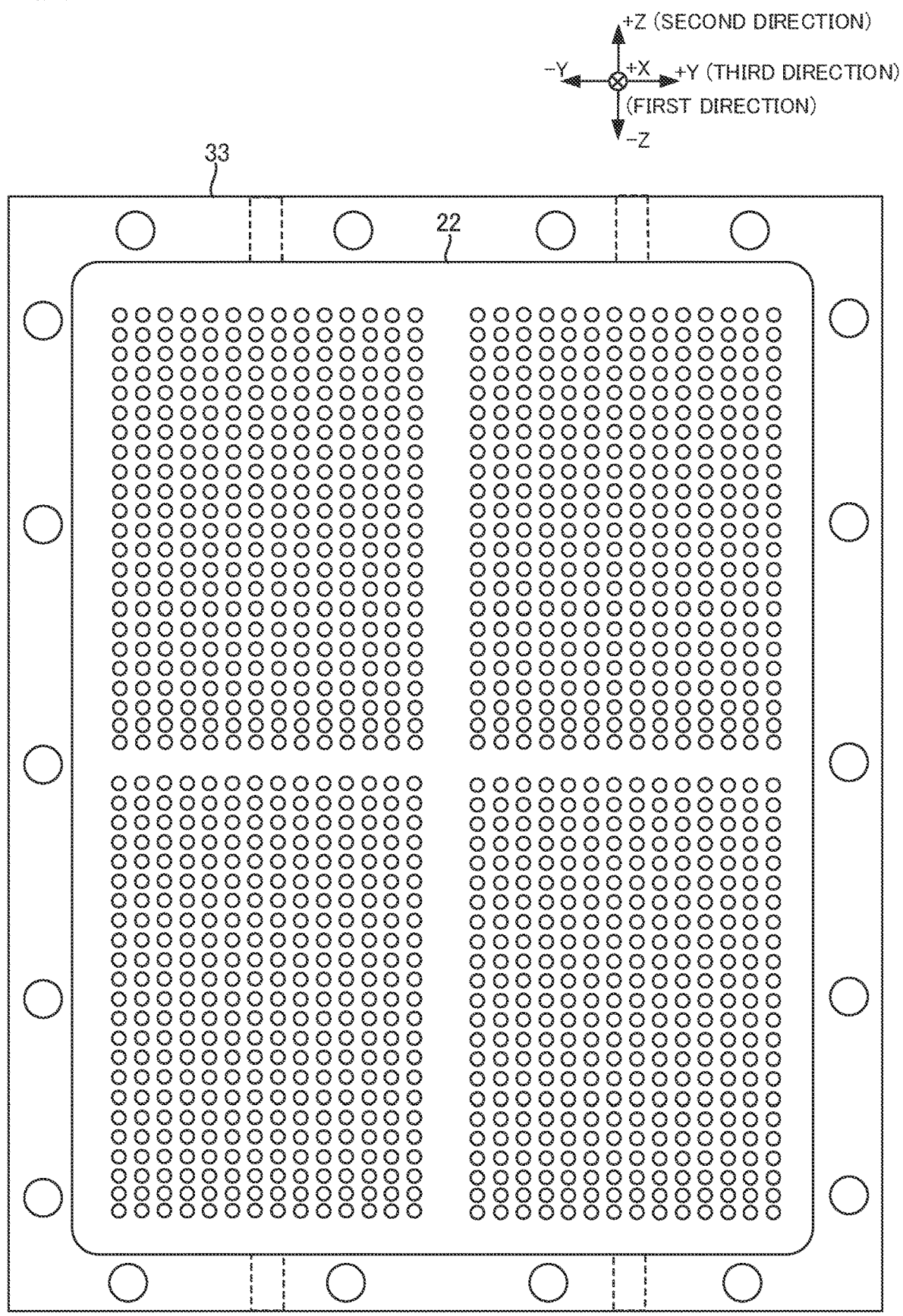
FIG. 3 is a plan view showing the positional relationship of a cathode electrode 22 with an intermediate chamber frame 33.

FIG. 3 is a plan view showing the positional relationship of the cathode electrode 22 with the intermediate chamber frame 33.

FIG. 3 also shows that the edge portions of the cathode electrode 22, the fluorine mesh sheet 252 (FIG. 2), and the cation exchange membrane 21 (FIG. 2) are sandwiched between the frames 24 and 33.

(Configuration of Net-Shaped Cushions 312)

Figure 4:
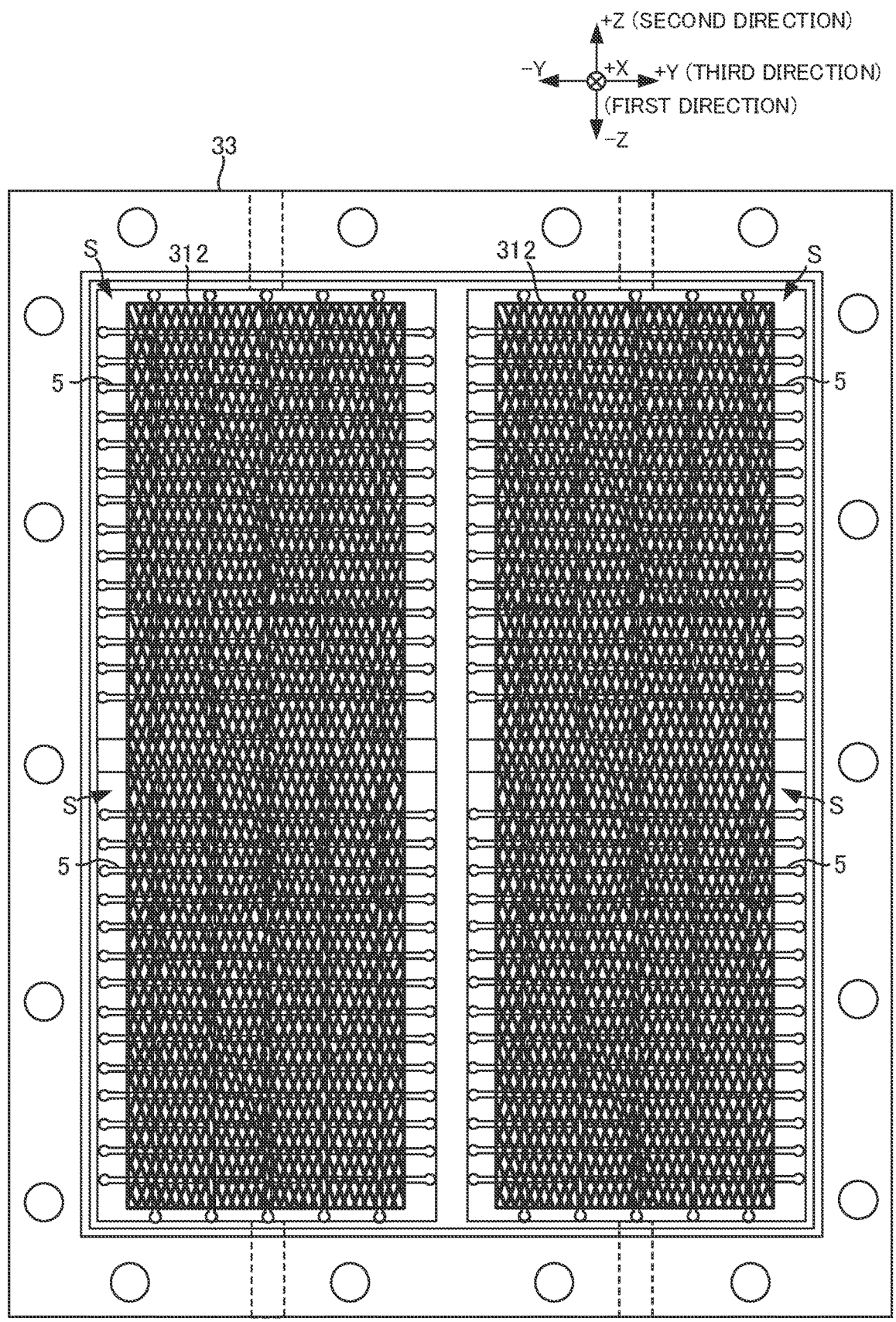
FIG. 4 is a plan view showing net-shaped cushions 312 located on the −X-direction side of spacers 5.

FIG. 4 is a plan view showing the net-shaped cushions 312 located on the −X-direction side of the spacers 5.

The net-shaped cushions 312 each have rhombic meshes and are made, for example, of polyethylene and therefore have elasticity. The net-shaped cushions 312 are shorter than the length between frame portions of the intermediate chamber frame 33 that are the frame portions on opposite sides in the Z direction, and the width of the net-shaped cushions 312 in the direction Y is also shorter than the width of the accommodation spaces S. The net-shaped cushions 312 are disposed in positions where the net-shaped cushions 312 do not interfere with the frame portions of the intermediate chamber frame 33. The net-shaped cushions 314 located on the +X-direction side of the spacers 5 have the same configuration as that of the net-shaped cushions 312 described above. In the present embodiment, the internal pressure in the intermediate chamber 3 can be readily adjusted by setting as appropriate the thicknesses of the net-shaped cushions 312 and 314 and the numbers of net-shaped cushions 312 and 314 stacked on each other in the direction X. The net-shaped cushions 312 and 314 can further prevent direct contact of the spacers 5 with the exchange membranes 21 and 41 and can therefore protect the exchange membranes 21 and 41. The net-shaped cushions 312 or 314 may be provided on only one side of the spacers 5.

Figure 13:
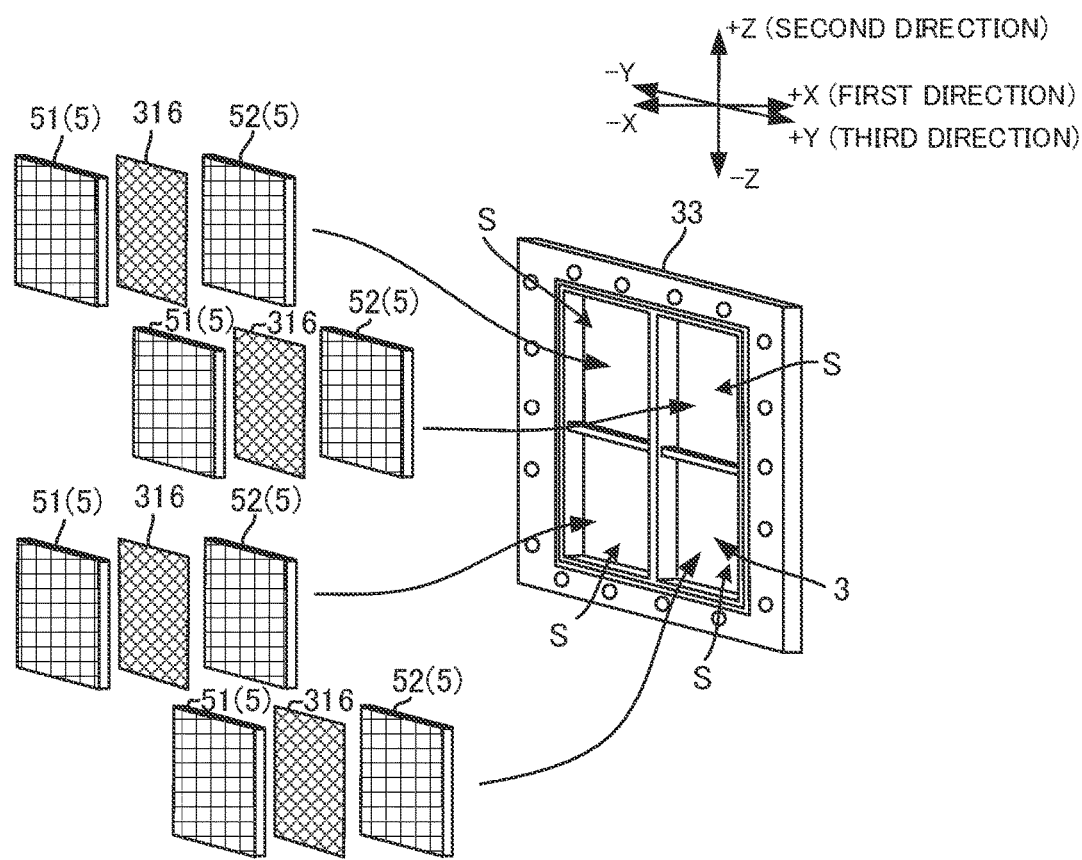
FIG. 13 shows another example of the positions where the net-shaped cushions are placed.

FIG. 13 shows another example of the positions where the net-shaped cushions are placed.

Net-shaped cushions 316 may be provided between the cathode-side grids 51 and the anode-side grids 52. Also in this case, the internal pressure in the intermediate chamber 3 can be readily adjusted by setting as appropriate the thickness of the net-shaped cushion 316 and the number of net-shaped cushions 316 stacked on each other in the direction X. It is thus preferable to provide cushions on at least one side of the spacers 5 or between the grids 51 and 52. The cushions only need to have elasticity and water permeability and may, for example, be a nonwoven fabric in addition to the net-shaped cushions 312 and 314.

(Configuration of Intermediate Chamber Frame 33)

Figure 5:
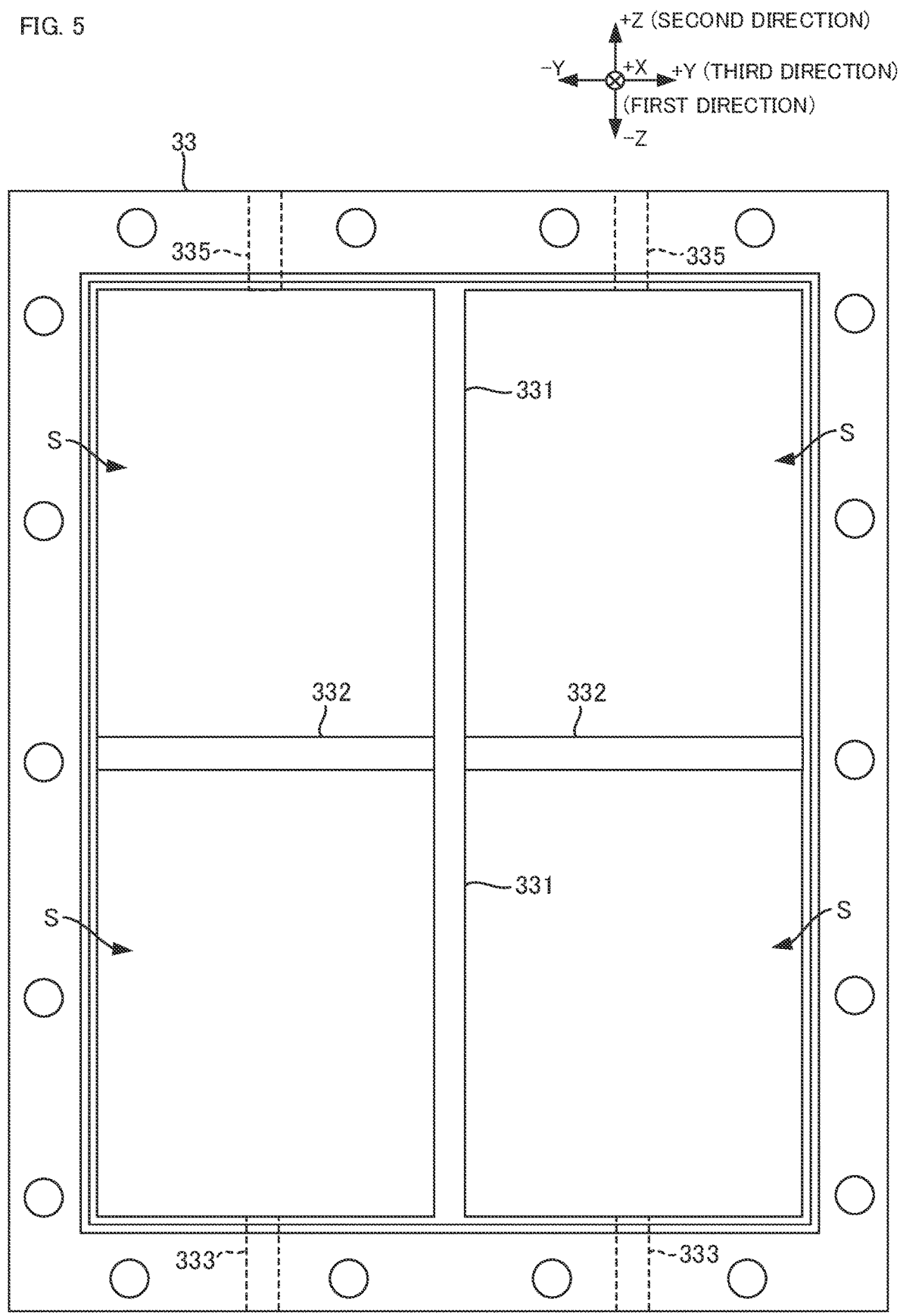
FIG. 5 is a plan view of an intermediate chamber frame 33.

FIG. 5 is a plan view of the intermediate chamber frame 33.

The −Z-direction-side (one side in direction Z) inner wall portion of the intermediate chamber frame 33 has salt water supply ports 333. The supply ports 333 are each located in the position corresponding to the Y-direction center of the corresponding −Z-direction-side accommodation space S and pass through the intermediate chamber frame 33. The supply ports 333 are connected to the salt water supply side of the circulation tank 81, for example, via a union or any other joint and a pipe, and the salt water is supplied to the −Z-direction-side spacers 5 via the supply ports 333.

The +Z-direction-side inner wall portion of the intermediate chamber frame 33 has salt water discharge ports 335. The discharge ports 335 are each located in the position corresponding to the Y-direction center of the corresponding +Z-direction-side accommodation space S and pass through the intermediate chamber frame 33. The discharge ports 335 are connected to the salt water recovery side of the circulation tank 81, for example, via a union or any other joint and a pipe, and the salt water having passed through the +Z-direction-side spacers 5 is discharged out of the intermediate chamber frame 33 via the discharge ports 335.

(Configuration of Cathode-Side Grids 51)

Figure 6:
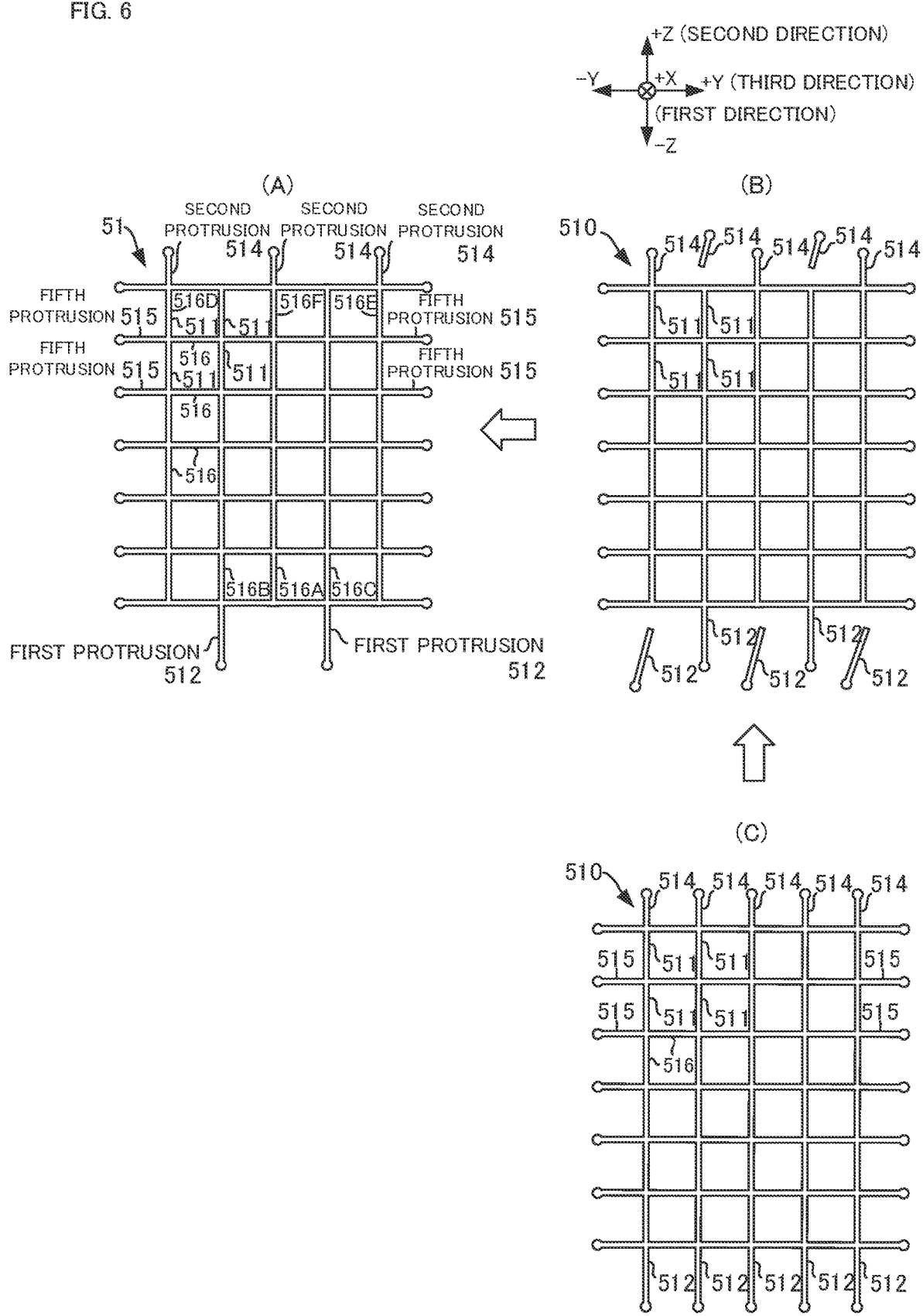
FIG. 6 describes the configuration of cathode-side grids 51 and a method for producing the same.

FIG. 6 describes the configuration of the cathode-side grids 51 and a method for producing the same.

In each of the cathode-side grids 51, the cathode-side holes 511 each have a square shape in the plan view and are arranged linearly in the directions Z and Y, as shown in FIG. 6(A). In the present embodiment, six cathode-side holes 511 are arranged in the direction Z and four in the direction Y.

Figure 8:
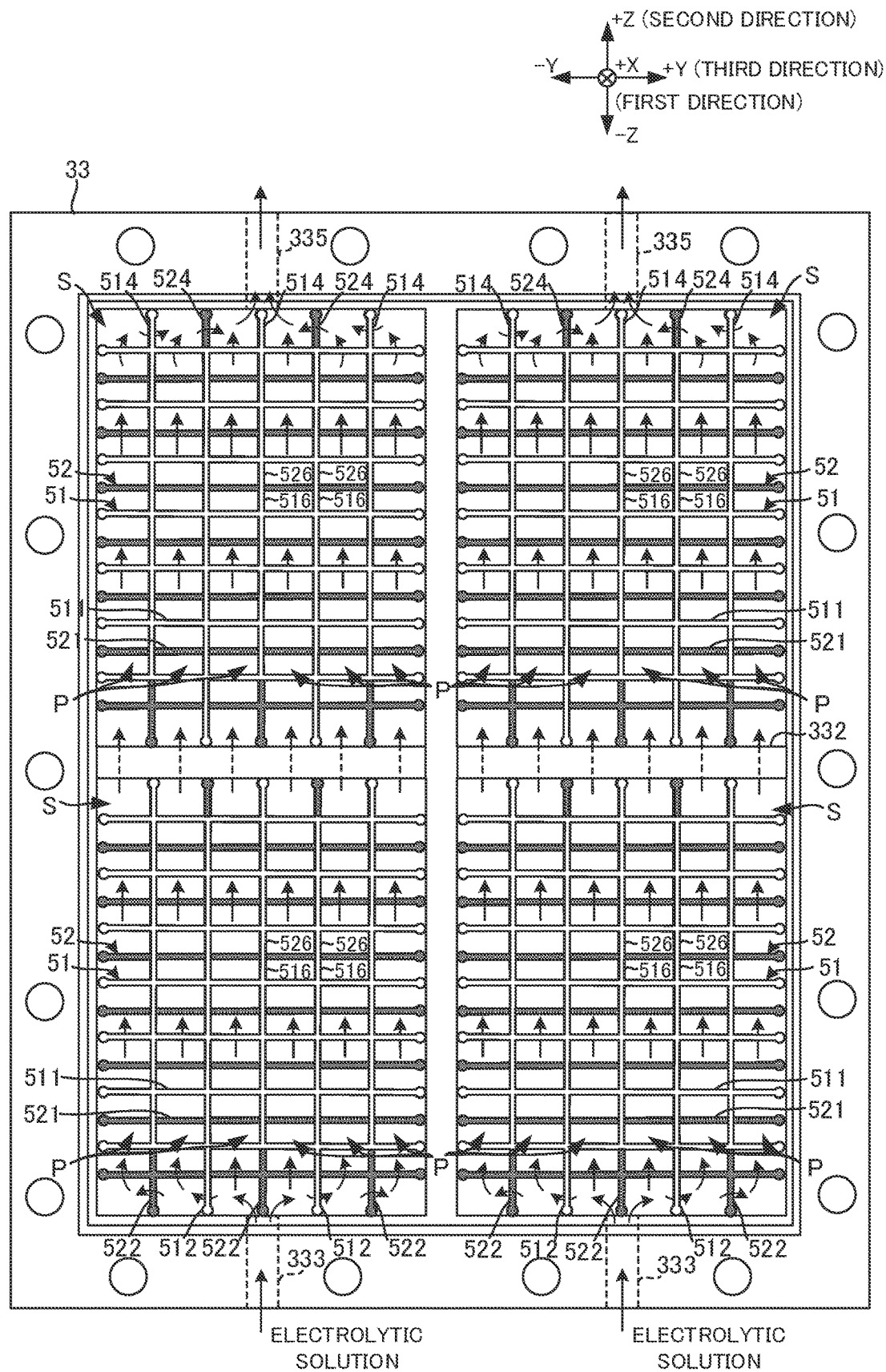
FIG. 8 shows the intermediate chamber frame 33 with the spacers 5 accommodated therein.

A plurality of first protrusions 512 protrude in the direction −Z from the −Z-direction-side end of each of the cathode-side grids 51. In the present embodiment, the first protrusions 512 extend in the direction Z with respect to wall sections 516B and 516C on opposite sides of a wall section 516A of the central cathode-side hole 511 out of wall sections 516 of the cathode-side holes 511 that extend in the direction Z. In the present specification, wall sections of the cathode-side holes 511 that extend in the directions Z and Y are simply referred to as the wall sections 516 when no wall section in a specific position is referred to. Similarly, wall sections of the anode-side holes 521 are also referred simply to wall sections 526 when no wall section in a specific position is referred to, as shown in FIG. 8, which will be described later.

A plurality of second protrusions 514 protrude in the direction +Z from the +Z-direction-side end of each of the cathode-side grids 51. The second protrusions 514 differ in length from the first protrusions 512 and in the present embodiment are shorter than the first protrusions 512. The second protrusions 514 extend in the direction Z with respect to wall sections 516D and 516E on opposite sides in the direction Y and a wall section 516F at the center in the direction Y out of the wall sections 516 of the cathode-side holes 511 that extend in the direction Z.

That is, the first protrusion 512 and the second protrusion 514 on opposite sides in the direction Z are located in different positions in the direction Y, specifically, in alternating positions in the direction Y.

Fifth protrusions 515 protrude from Y-direction opposite ends of the cathode-side grid 51 toward the opposite sides in the direction Y. The fifth protrusions 515 on opposite sides in the direction Y have the same length. The fifth protrusions 515 extend in the direction Y with respect to the wall sections 516 of the cathode-side holes 511 that extend in the direction Y.

The cathode-side grids 51 are each produced from a grid 510 shown in FIG. 6(C). The grid 510 has roughly the same configuration as that of the cathode-side grids 51 but differs therefrom in that the first protrusions 512 and the second protrusions 514 are provided on opposite sides of the grid 510 in the direction Z for each of the wall sections 516 of the cathode-side holes 511 that extend in the direction Z.

The first protrusions 512 and the second protrusions 514 of the grid 510 in every other column in the direction Y are cut at the roots thereof so that the first and second protrusions are alternately arranged in the direction Y, as shown in FIG. 6(B). The cathode-side grids 51 are thus produced.

(State in which Cathode-Side Grid 51 and Anode-Side Grid 52 are Combined with Each Other)

Figure 7:
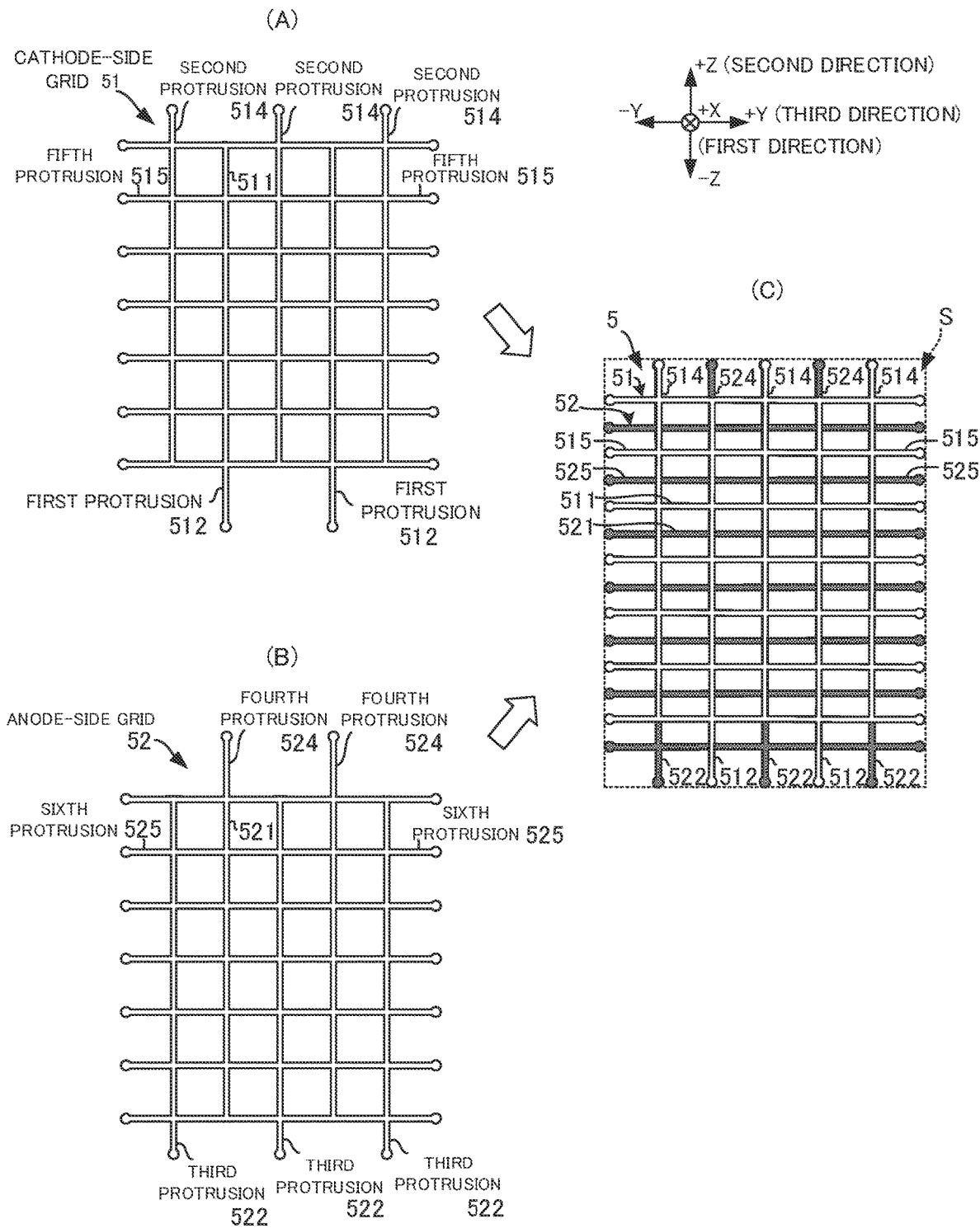
FIG. 7 is a state in which the cathode-side grid 51 and an anode-side grid 52 are combined with each other.

FIG. 7(A) shows each of the cathode-side grids 51, and FIG. 7(B) shows each of the anode-side grids 52. The anode-side grids 52 are the same as the cathode-side grids 51 but have orientation reversed in the direction Z. The anode-side grids 52 each have the anode-side holes 521 similar to the cathode-side holes 511. That is, the anode-side holes 521 and the cathode-side holes 511 have the same length in the direction Z and are arranged by the same number in the direction Z. Furthermore, the anode-side holes 521 and the cathode-side holes 511 have the same length in the direction Y and are arranged by the same number in the direction Y. The anode-side grids 52 each have sixth protrusions 525 similar to the fifth protrusions 515. The anode-side grids 52 each have third protrusions 522, which correspond to the second protrusions 514 of each of the cathode-side grids 51, on the side −Z-direction side and fourth protrusions 524, which correspond to the first protrusions 512 of each of the cathode-side grids 51, on the +Z-direction side.

The anode-side grids 52 are placed on the +X direction-side of the cathode-side grids 51 in the accommodation spaces S of the intermediate chamber frame 33, as shown in color in FIG. 7(C). In this configuration, the protrusions 512 and 514 on Z-direction opposite sides of each of the cathode-side grids 51 differ in length from each other and has a Z-direction arrangement reversed from the Z-direction arrangement of the protrusions 522 and 524 of each of the anode-side grids 52 on opposite sides in the direction Z. The process of cutting the protrusions 512 of each of the cathode-side grids 51 and the protrusions 522 of each of the anode-side grids 52 may be so carried out that the positions of the protrusions 512 and 522 in the direction Y are reversed. The process of cutting the protrusions 514 and 524 may also be so carried out that the positions of the protrusions 514 and 524 in the direction Y are reversed. The arrangement of the cathode-side grid 51 and anode-side grid 52 in each of the accommodation spaces S may be upside down.

As a result, the cathode-side holes 511 and the anode-side holes 521, which are aligned with the cathode-side holes 511 in the direction X, are shifted from each other in the direction Z. Since the fifth protrusions 515 of each of the cathode-side grids 51 on opposite sides in the direction Y and the sixth protrusions 525 of each of the anode-side grids 52 on opposite sides in the direction Y have the same length, the cathode-side hole 511 and the anode-side hole 521 are located in the same positions in the direction Y.

On the −Z-direction side of the grids 51 and 52, the protrusions 512 and 522 are alternately arranged in the direction Y. On the +Z-direction side of the grids 51 and 52, the protrusions 514 and 524 are alternately arranged in the direction Y.

(Salt Water Entering and Exiting Out of Each Passage P in Grids 51 and 52)

FIG. 8 shows the intermediate chamber frame 33 with the spacers 5 accommodated therein.

In the grids 51 and 52 of each of the spacers 5, the wall sections 516 of the holes 511 and the wall sections 526 of the holes 521, which extend in the direction Z, are located in the same positions in the direction Y and are in contact with each other in the direction X (vertical direction in the plane of view of FIG. 8). The wall sections 516 and 526, which extend in the direction Z and are adjacent to each other in the direction Y, form a plurality of passages P in the direction Y that guide the salt water in the direction Z. At Y-direction opposite ends of each of the spacers 5, the passages P are formed from the wall section of the accommodation space S, the wall sections 516 of the holes 511 that extend in the direction Z, and the wall sections 526 of the holes 521 that extend in the direction Z.

At the −Z-direction-side end of each of the spacers 5, the protrusions 512 and 522 are alternately located in the direction Y, and the region where the protrusions 512 and 522 are alternately located serves as the entrance of the salt water into the passages P. The salt water is supplied via the supply port 333 to the region where the −Z-direction-side protrusions 512 and 522 of each of the spacers 5 are located. In this region, the salt water spreads to opposite sides in the direction Y while passing through the gaps between the protrusions 512 and 522. The salt water then travels through the passages P and travels in the direction +Z.

As described above, in the present embodiment, in which the protrusions 512 and 522 are alternately located in the direction Y, even when the salt water is supplied from a single location or the supply port 333 to the region where the protrusions 512 and 522 are present, the salt water can be spread over the region in the direction Y.

The salt water exits out of the passages P and then hits the partition 332. The salt water passes between the partition 332 and the cation electrolytic membrane 21 and between the partition 332 and the anion electrolytic membrane 41 to the +Z-direction-side accommodation space S. In the present embodiment, the presence of net-shaped cushions 312 and 314 on X-direction opposite sides of the partition 332 ensures good flow of the salt water between the partition 332 and each of the electrolytic membranes 21 and 41.

The salt water travels into the passages P arranged in the direction Y in the +Z-direction-side accommodation space S and travels through the passages P in the direction +Z. At the +Z-direction-side end of the spacers 5, the protrusions 514 and 524 are alternately located in the direction Y, and the region where the protrusions 514 and 524 are alternately located serves as the exit of the salt water from the passages P. The salt water discharged from the passages P travels in the region to the center in the direction Y while passing through the gaps between the protrusions 514 and 524. The salt water is then discharged via the discharge port 335.

As described above, in the present embodiment, since the protrusions 514 and 524 are alternately located in the direction Y, the salt water from the region where the protrusions 514 and 524 are located throughout the direction Y can be collected to one location or the discharge port 335.

(Effect of Grids 51 and 52 on Salt Water)

FIG. 9 is a cross-sectional view of the electrolytic cell 10.

The cathode-side grids 51 and anode-side grids 52 guide the salt water flowing into the accommodation spaces S (intermediate chamber 3) from the negative side in the direction Z to the positive side in the direction Z while causing the salt water to meander in the direction X by alternately guiding the salt water to the cathode-side holes 511 and anode-side holes 521, which are shifted from each other in the direction Z. Specifically, in each of the spacers 5 in the directions ±Z, the passages P extending in the direction Z are formed by the grids 51 and 52 and arranged in the direction Y, and the salt water travels in each of the passages P, as described above. In the passages P, the salt water is alternately guided to the cathode-side holes 511 and the anode-side holes 521, which are shifted from each other in the direction Z, and travels in the direction +Z while meandering in the direction X.

In this process, the electrolysis causes the cations Na$^+$ in the salt water to move to the cathode chamber 2 through the cathode-side holes 511 and the cation electrolytic membrane 21 and the anions Cl$^-$ in the salt water to move to the anode chamber 4 through the anode-side holes 521 and the anion electrolytic membrane 41.

In the present embodiment, the salt water is guided in the direction +Z toward the discharge port 335 while meandering in the direction X as described above, whereby the salt water can be agitated well and the ion supply capability provided by the intermediate chamber 3 can be improved. In addition, since the grids 51 and 52, which form the spacers 5, have the same configuration but differ only in that they have opposite orientations in the direction Z, the manufacturing cost can be suppressed.

The effective area of each of the spacers 5 with respect to the cathode chamber 2 increases as the area of the opening of each of the cathode-side holes 511 increases. In the present embodiment, the wall sections 516 of the four sides of each of the cathode-side holes 511 each have a mountain-like shape that tapers with distance toward the cathode chamber 2 in a cross-sectional view. Therefore, the thickness of each of the wall sections 516 at the opening of the cathode-side hole 511 can be reduced, and the area of the opening of each of the cathode-side holes 511 can be increased. As a result, in the present embodiment, the effective area of each of the spacers 5 with respect to the cathode chamber 2 can be increased. In each of the cathode-side grids 51, a portion of each of the wall sections 516 that is the portion opposite from the cathode chamber 2 (on +X side) is thicker, whereby sufficient strength of the cathode-side grid 51 can be maintained while a large effective area with respect to the cathode chamber 2 is maintained.

Similarly, the wall sections 526 of the four sides of each of the anode-side holes 521 each have a mountain-like shape that tapers with distance toward the anode chamber 4 in a cross-sectional view. Therefore, in the present embodiment, as in the above description, the area of the opening of each of the anode-side holes 521 can be increased, and the effective area of each of the spacers 5 with respect to the anode chamber 4 can be increased while sufficient strength of the anode-side grids 51 is maintained.

Second Embodiment (Overall Configuration of Electrolytic Cell 10A)

Figure 10:
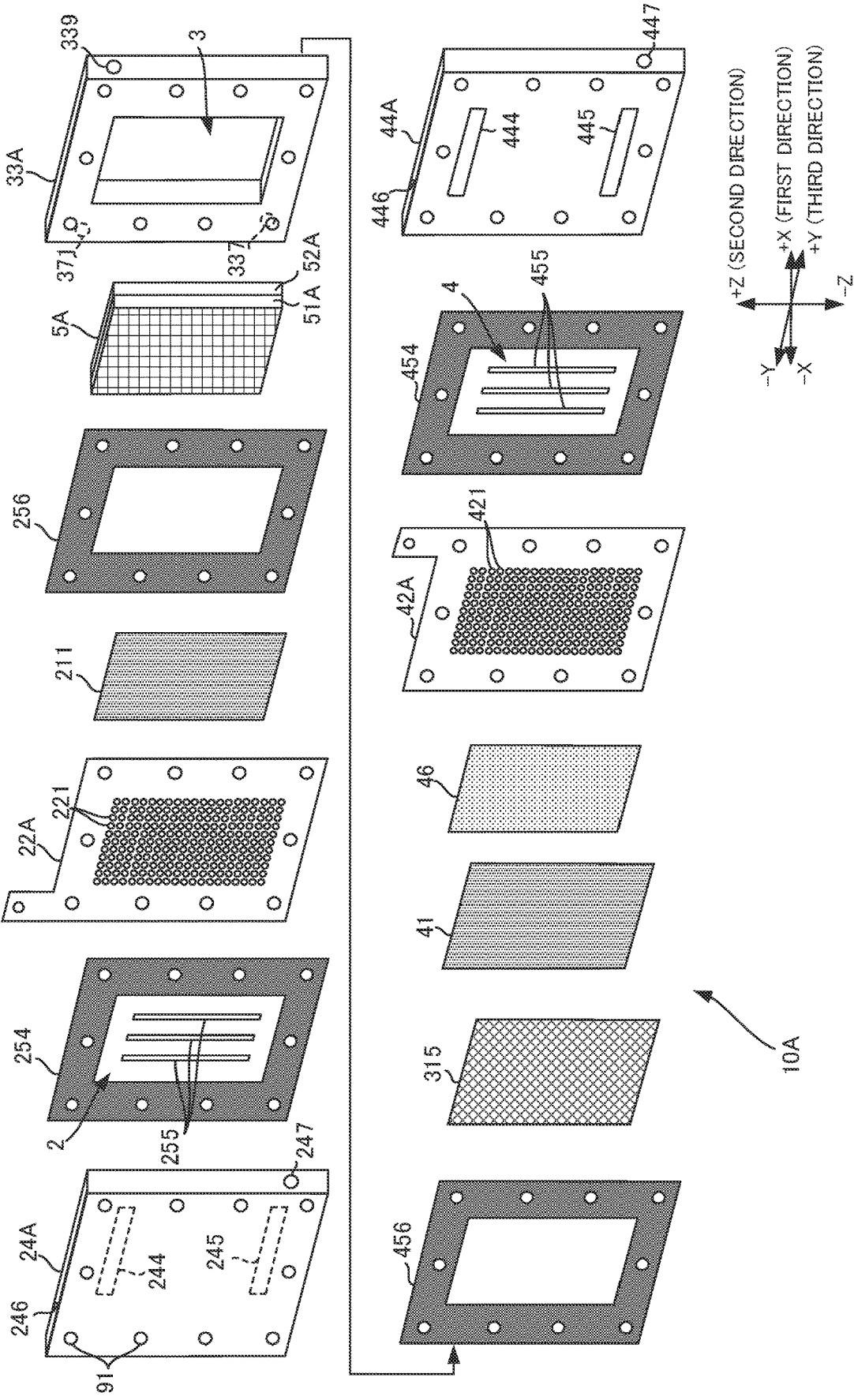
FIG. 10 is an exploded perspective view showing an electrolytic cell 10A according to a second embodiment.

FIG. 10 is an exploded perspective view showing the electrolytic cell 10A.

A difference between the electrolytic cell 10A and the electrolytic cell 10 is that the spacer 5A is simplified, and that an intermediate chamber frame 33A accordingly supplies the spacer 5A with the salt water throughout the direction Y and collects the salt water having passed through the spacer 5A throughout the direction Y. This point will be described later.

In the electrolytic cell 10A, a cathode chamber frame 24A, the intermediate chamber frame 33A, and an anode chamber frame 44A each have a rectangular shape elongated in the direction Z in the plan view and have roughly the same outer shape and thickness. The cathode chamber frame 24A is laid on a horizontal jig, and elements 254, 22A, 256, 33A, 456, 42A, 454, and 44A are placed and positioned by stacking the elements on the cathode chamber frame 24A with the bolts 92 (FIG. 12) passing through the holes 91 in edge portion of the cathode chamber frame 24A and causing the bolts 92 to pass through the holes in edge portions of the elements. The bolts 92 having passed to the anode chamber frame 44A are tightened with the nuts 93 (FIG. 12), whereby the frames 24A, 33A, and 44A are fastened with the elements disposed between the frames 24A, 33A, and 44A.

The cathode chamber frame 24A has an opening 244, which is shifted toward the +Z-direction-side end of the cathode chamber 2 and opens along the direction Y of the cathode chamber 2, and an opening 245, which is shifted toward the −Z-direction-side end of the cathode chamber 2 and opens along the direction Y of the cathode chamber 2. For the internal structure of the electrolytic cell 10A and the positional relationship among the elements, refer also to FIG. 12 as appropriate.

The opening 244 communicates with a −Y-direction-side hole 246 at the +Z-direction-side surface of the cathode chamber frame 24A. The hole 246 is connected to the alkaline water discharge port 23 via a union or any other joint and a pipe. The opening 245 communicates with a hole 247 at the +Y-direction-side surface of the cathode chamber frame 24A. The hole 247 is connected to the raw water supply port 101 via a union or any other joint and a pipe.

The anode chamber frame 44A has an opening 444, which is shifted toward the +Z-direction-side end of the anode chamber 4 and opens along the direction Y of the anode chamber 4, and an opening 445, which is shifted toward the −Z-direction-side end of the anode chamber 4 and opens along the direction Y of the anode chamber 4. The opening 444 communicates with a −Y-direction-side hole 446 at a +Z-direction-side surface of the anode chamber frame 44A. The hole 446 is connected to the acid water discharge port 43 via a union or any other joint and a pipe. The opening 445 communicates with a hole 447 at the +Y-direction-side surface of the anode chamber frame 44A. The hole 447 is connected to the raw water supply port 101 via a union or any other joint and a pipe.

A cathode electrode 22A is disposed on the +X-direction side of the cathode chamber frame 24A via the frame-shaped gasket 254 and binding bands 255. The gasket 254 is made of ethylene-propylene rubber (EPT) and has the same shape as the planar shape of the intermediate chamber frame 33A. The gaskets 254, 256, 456, and 454 can be identical to one another.

The binding bands 255 are located inside the gasket 254 and arranged at intervals in the direction Y, and no fixing head is provided. The gasket 254 and the binding bands 255 ensure a space where the raw water can flow in the cathode chamber 2. The cathode electrode 22A, specifically, a portion corresponding to the opening of the intermediate chamber frame 33A has a plurality of holes 221. The portions protruding in the direction +Z from the cathode electrode 22A and the anode electrode 42A, the latter of which will be described later, are terminals. Terminals may also be formed at the electrodes 22 and 42 in the first embodiment.

The cation exchange membrane 211 and the gasket 256 are located between the cathode electrode 22A and the intermediate chamber frame 33A. The cation exchange membrane 211 is located inside the gasket 256. The cathode chamber 2 is formed between the cathode electrode 22A and the cathode chamber frame 24A.

The intermediate chamber frame 33A has a frame-like shape and accommodates, in the present embodiment, one spacer 5A in the frame-shaped portion. The size of the spacer 5A is assumed to be equal to the size of the spacers 5 in the embodiment described above. Therefore, the electrolytic cell 10 according to the embodiment described above accommodates four spacers 5 in the planar direction, whereas the electrolytic cell 10A according to the present embodiment accommodates only one spacer 5A and is therefore smaller than the electrolytic cell 10.

The anode electrode 42A is located on the +X-direction side of the intermediate chamber frame 33A via the gasket 456. The anode electrode 42A has a plurality of holes 421 in the portion corresponding to the opening of the intermediate chamber frame 33A.

Between the spacer 5A and the anode electrode 42A, a nonwoven fabric 315, the anion exchange membrane 41, and a platinum mesh sheet 46 are sequentially located from the side facing the spacer 5A. The elements 315, 41, and 46 have roughly the same shapes as the shape of the opening of the intermediate chamber frame 33A.

The nonwoven fabric 315 is located inside the gasket 456 and functions as a cushion having elasticity and water permeability. The internal pressure in the intermediate chamber 3 can be readily adjusted by setting the thickness of the nonwoven fabric 315 and the number of nonwoven fabrics 315 in the direction X as appropriate. The nonwoven fabric 315 eases the contact of the spacer 5A against the anion exchange membrane 41 to protect the anion exchange membrane 41. The nonwoven fabric 315 is provided only on the side facing the anode chamber 4 with respect to the spacer 5A and may also be provided on the side facing the cathode chamber 2 with respect to the spacer 5A.

The gasket 454 is disposed between the anode electrode 42A and the anode chamber frame 44A, and the anode chamber 4 is formed between the anode electrode 42A and the anode chamber frame 44A. A plurality of binding bands 455 are disposed inside the gasket 454 to ensure a space where the raw water flows in the anode chamber 4.

(Salt Water Entering and Exiting Out of Each Passage P in Grids 51A and 52A)

Figure 11:
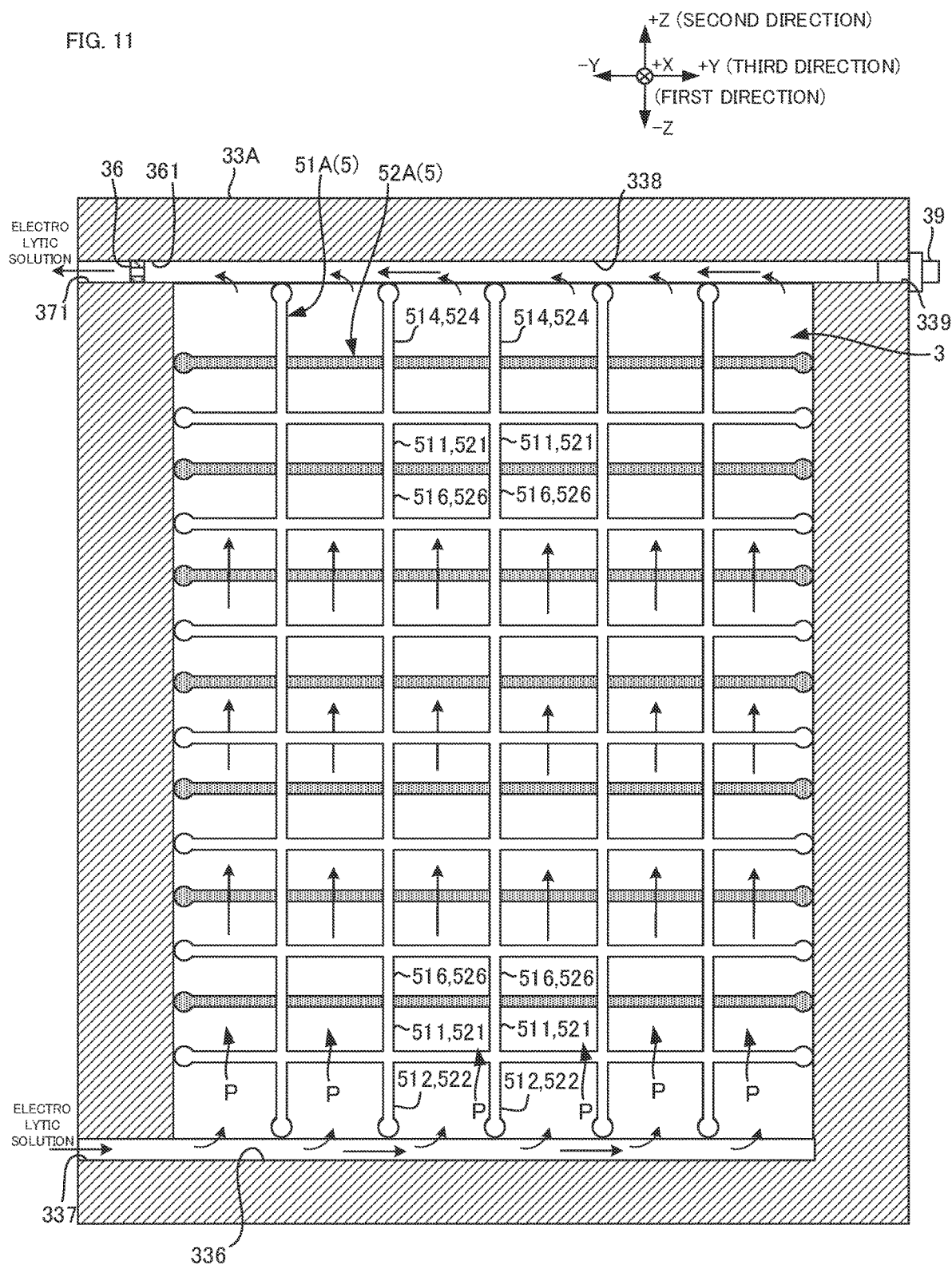
FIG. 11 is a plan view showing a spacer 5A and an intermediate chamber frame 33A.

FIG. 11 is a plan view showing the spacer 5A and the intermediate chamber frame 33A. In FIG. 11, the anode-side grid 52A is drawn in color.

The spacer 5A includes the cathode-side grid 51A and the anode-side grid 52A. The cathode-side grid 51A is the same as the grid 510 (FIG. 6(C)) used to create the cathode-side grid 51 in the embodiment described above. The anode-side grid 52A is the same as the cathode-side grid 51A but differs therefrom in that the orientation of the anode-side grid 52A is opposite from that of the cathode-side grid 51A in the direction Z. Therefore, unlike the embodiment described above, the present embodiment eliminates the need to remove the protrusions 512, 514, 522, and 524 of the grids 51A and 52A on opposite sides in the direction Z.

In the embodiment described above, the −Z-direction-side protrusions 512 and 522 of the grids 51 and 52 are alternately provided in the direction Y, whereas in the present embodiment, the protrusions 512 and 522 are provided for each of the wall sections 516 and 526 of the cathode-side holes 511 and the anode-side holes 521 that extend in the direction Z. The protrusions 512 and 522 coincide with each other in the plan view and are in contact with each other in the direction X (vertical direction in the plane of view).

Therefore, in the present embodiment, each space between a set of the protrusions 512 and 522 that coincide with each other in the plan view and a set of the protrusions 512 and 522 that are adjacent to the set described above in the direction Y and coincide with each other in the plan view also forms a salt water passage P extending in the direction Z. That is, in the present embodiment, the salt water passages P extending in the direction Z are formed so as to extend from the regions of the cathode-side holes 511 and anode-side holes 521 to the protrusions 512 and 522 in the direction −Z.

To make the structure described above function, a supply groove 336 extending in the direction Y is formed in the −Z-direction-side inner wall section of the intermediate chamber frame 33A. The supply groove 336 supplies the passages P arranged in the direction Y with the salt water. The supply groove 336 extends linearly in the intermediate chamber frame 33A in the direction −Y and opens via the Y-direction-side side surface as a salt water acceptance port 337 of the intermediate chamber frame 33A. The acceptance port 337 is a hole and is connected to the supply side of the circulation tank 81, for example, via a union or any other joint and a pipe.

Similarly, in the embodiment described above, the +Z-direction-side protrusions 514 and 524 of the grids 51 and 52 are alternately provided in the direction Y, whereas in the present embodiment, the protrusions 514 and 524 are provided for each of the wall sections 516 and 526 of the cathode-side holes 511 and the anode-side holes 521 that extend in the direction Z. The protrusions 514 and 524 coincide with each other in the plan view and are in contact with each other in the direction X (vertical direction in the plane of view).

Therefore, in the present embodiment, each space between a set of the protrusions 514 and 524 that coincide with each other in the plan view and a set of the protrusions 514 and 524 that are adjacent to the set described above in the direction Y and coincide with each other in the plan view also forms a salt water passage P extending in the direction Z. That is, in the present embodiment, the salt water passages P extending in the direction Z are formed so as to extend from the regions of the cathode-side holes 511 and anode-side holes 521 to the protrusions 514 and 524 in the direction +Z.

To make the structure described above function, a salt water discharge groove 338 extending throughout the direction Y is formed in the +Z-direction-side inner wall section of the intermediate chamber frame 33A. The salt water is discharged from the passages P arranged in the direction Y into the discharge groove 338. The discharge groove 338 extends linearly in the intermediate chamber frame 33A in the direction −Y and opens via the −Y-direction-side side surface as a salt water discharge port 371 of the intermediate chamber frame 33A. In other words, the discharge groove 338 communicates with the discharge port 371 via a channel 361 in the intermediate chamber frame 33A. The discharge port 371 is a hole and is connected to the discharge side of the circulation tank 81, for example, via a union or any other joint and a pipe. An orifice 36 is inserted through the discharge port 371 into the channel 361 and placed therein, whereby the flow pressure of the salt water increases.

The discharge groove 338 extends linearly in the intermediate chamber frame 33A in the direction +Y and opens via the +Y-direction-side side surface as a water drain port 339. The drain port 339 is a hole and is normally closed by a union 39 with a cap. During the assembly of the electrolytic cell 10A, after the frames 24A, 33A, and 44A are fastened, the anode chamber frame 44A (FIG. 10) is filled with water. Caps are then attached to unions that close the holes 446 and 447, which are the water entrance and exit ports of the anode chamber frame 44A, so that the anode chamber frame 44A is sealed.

The intermediate chamber frame 33A is also filled with water. The union 39 at the exit port 339 remains in the state in which the cap is attached thereto. Sealing unions that communicate with each other via a tube are attached to the acceptance port 337 and the discharge port 371 at the −Y-direction-side side surface. The intermediate chamber frame 33A is thus sealed. When the electrolytic cell 10A is installed, the cap of the union 39 at the exit port 339 is removed, and the water is drained using the exit port 339. Unions used at the time of installation are attached to the acceptance port 337 and the discharge port 371.

(Effect of Grids 51A and 52A on Salt Water)

Figure 12:
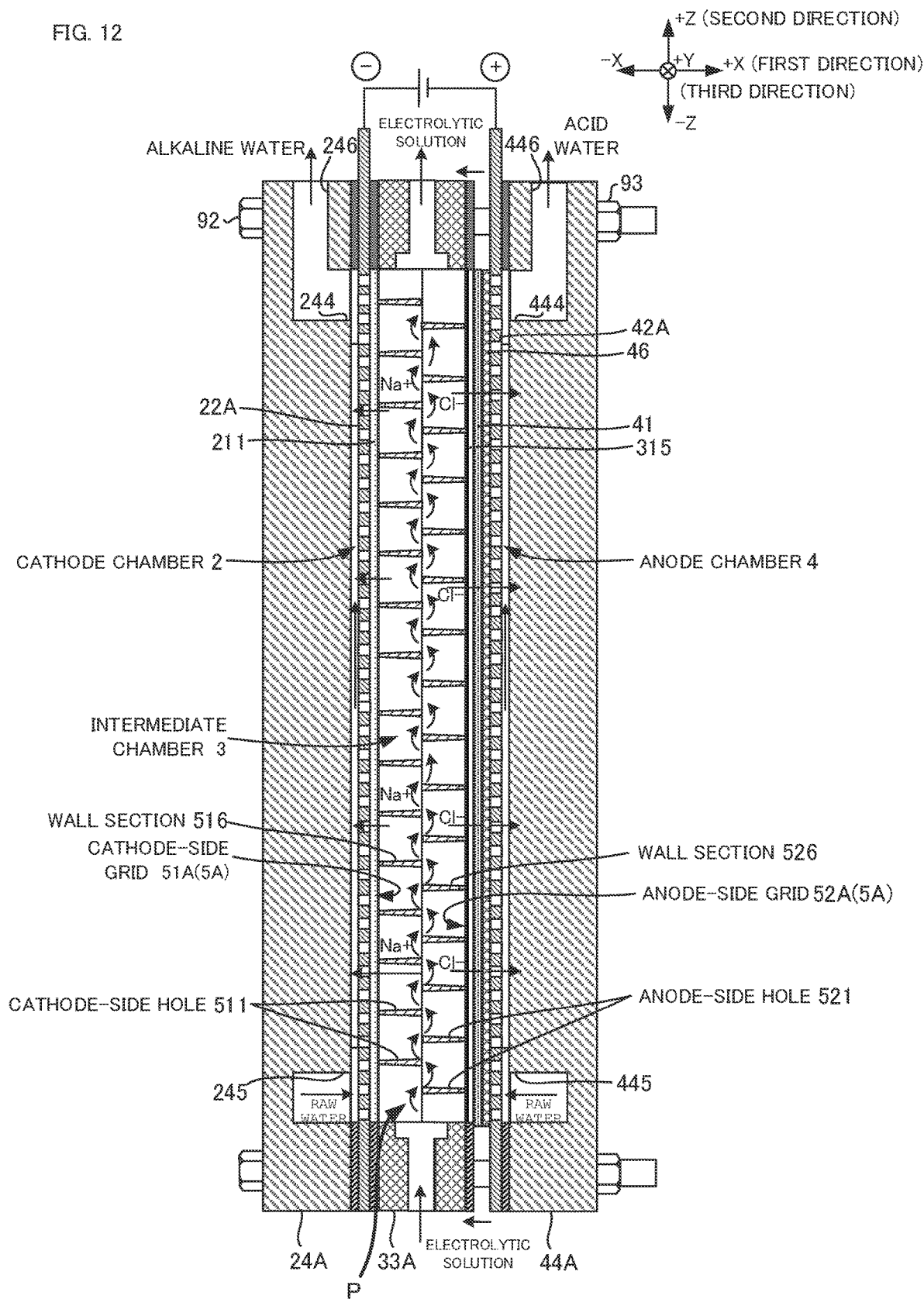
FIG. 12 is a cross-sectional view of the electrolytic cell 10A.

FIG. 12 is a cross-sectional view of the electrolytic cell 10A. In FIG. 12, the electrolytic cell 10A is depicted with the anode chamber frame 44A not fully assembled to the intermediate chamber frame 33A in order to illustrate the elements between the anode chamber frame 44A and the intermediate chamber frame 33A.

Also in the present embodiment, the cathode-side grid 51A and anode-side grid 52A cause the salt water flowing into the intermediate chamber 3 to meander in the direction X by alternately guiding the salt water to the cathode-side holes 511 and anode-side holes 521. Therefore, the salt water can be agitated well, and the ion supply capability provided by the intermediate chamber 3 can be improved.

The wall sections 516 of the cathode-side holes 511 each have a mountain-like shape that tapers with distance toward the cathode chamber 2 in a cross-sectional view, and the wall sections 526 of the anode-side holes 521 each have a mountain-like shape that tapers with distance toward the anode chamber 4. Therefore, in the present embodiment, the effective area of each of the spacers 5 with respect to the cathode chamber 2 and the anode chamber 4 can be increased.

(Variations)

The spacers 5 and 5A can each have an arbitrary size, and the sizes of the electrolytic cell 10 and 10A can also be arbitrarily designed in correspondence with the spacers 5 and 5A. In the first embodiment, an arbitrary number of spacers 5 can be placed in the planar direction, and partitions 331 and 332 can be provided in the intermediate chamber frame 33 in accordance with the number of spacers 5.

The present invention can be implemented in the form of embodiments without departing from the features of the present invention. The embodiments, variations, and effects are presented only by way of example and should not be construed as limiting the present invention. Features and structures of the embodiments and variations can be added and combined with those described in the embodiments and variations in a variety of ways to achieve alternative configurations.

Reference Sings List

2: Cathode chamber, 3: Intermediate chamber, 4: Anode chamber, 5, 5A: Spacer, 8: Electrolyte solution circulator, 10, 10A: Electrolytic cell, 21: Cation exchange membrane, 22, 22A: Cathode electrode, 36: Orifice, 41: Anion exchange membrane, 42, 42A: Anode electrode, 51, 51A: Cathode-side grid, 52, 52A: Anode-side grid, 81: Circulation tank (tank), 88: Relief valve, 312, 314, 316: Net-shaped cushion (cushion), 315: Nonwoven fabric (cushion), 332: Partition, 333: Supply port, 336: Supply groove, 337: Acceptance port, 338: Discharge groove, 371: Discharge port, 511: Cathode-side hole, 512: First protrusion, 514: Second protrusion, 515: Fifth protrusion, 516: Wall section of cathode-side hole, 521: Anode-side hole, 522: Third protrusion, 524: Fourth protrusion, 525: Sixth protrusion, 526: Wall section of anode-side hole, Direction X: First direction, Direction Y: Third direction, Direction Z: Second direction

The invention claimed is:

1. An electrolytic cell comprising: a cathode chamber; an anode chamber; and an intermediate chamber between the cathode chamber and the anode chamber, wherein a spacer in the intermediate chamber includes a cathode-side grid and an anode-side grid arranged in a first direction in which the cathode and anode chambers face each other, cathode-side holes in the cathode-side grid and anode-side holes in the anode-side grid aligned with the cathode-side holes in the first direction are shifted from each other in a second direction perpendicular to the first direction, and the cathode-side grid and the anode-side grid guide an electrolytic solution flowing into the intermediate chamber from one side in the second direction to another side in the second direction by alternately guiding the electrolytic solution to the cathode-side holes and the anode-side holes, which are shifted in the second direction, while causing the electrolytic solution to meander in the first direction.

2. The electrolytic cell according to claim 1,
wherein the cathode-side holes each have a rectangular shape in a plan view, and wall sections of four sides of each of the cathode-side holes each become thinner toward the cathode chamber side in the first direction in a cross-sectional view, and
the anode-side holes each have a rectangular shape in the plan view, and wall sections of four sides of each of the anode-side holes each become thinner toward the anode chamber side in the first direction in a cross-sectional view.

3. The electrolytic cell according to claim 1,
wherein the cathode-side holes and the anode-side holes have the same length in the second direction and are arranged by the same number in the second direction, and the number of the cathode-side holes is the same as the number of the anode-side holes,
in the cathode-side grid, a first protrusion protrudes from a first end in the second direction, and a second protrusion different in length from the first protrusion protrudes from a second end in the second direction,
in the anode-side grid, a third protrusion having a length equal to the length of the second protrusion protrudes from a third end in the second direction, and a fourth protrusion having a length equal to the length of the first second protrusion protrudes from a fourth end in the second direction, and
in the second direction, the first end and the third end are opposite to the second end and the fourth end.

4. The electrolytic cell according to claim 3,
wherein the cathode-side holes and the anode-side holes have the same length in a third direction perpendicular to the first and second directions and are arranged by the same number in the third direction,
fifth protrusions having the same length protrude from opposite ends of the cathode-side grid in the third direction toward opposite sides in the third direction, and
sixth protrusions having a length equal to the length of the fifth protrusions protrude from opposite ends of the anode-side grid in the third direction toward opposite sides in the third direction.

5. The electrolytic cell according to claim 1,
wherein a cation exchange membrane and a first cushion are present between a cathode electrode in the cathode chamber and the cathode-side grid and sequentially arranged from a side facing the cathode electrode, and the first cushion has elasticity and water permeability, and/or an anion exchange membrane and a second cushion are present between an anode electrode in the anode chamber and the anode-side grid and sequentially arranged from a side facing the anode electrode, and the second cushion has elasticity and water permeability.

6. The electrolytic cell according to claim 1,
wherein a cushion having elasticity and water permeability is present between the cathode-side grid and the anode-side grid.

7. The electrolytic cell according to claim 1, further comprising:
an electrolytic solution circulator that sends the electrolytic solution to the intermediate chamber, recovers the electrolytic solution from the intermediate chamber, adds an electrolyte to the electrolytic solution, and circulates a resultant electrolytic solution,
wherein the electrolytic solution circulator includes
a tank that stores the electrolytic solution recovered from the intermediate chamber, and
a relief valve that operates when pressure of the electrolytic solution becomes higher than or equal to set pressure to lower the pressure of the electrolytic solution, and the relief valve is located in a channel which extends from the intermediate chamber to the tank and along which the electrolytic solution flows.

8. The electrolytic cell according to claim 4,
wherein the first protrusion, the second protrusion, the third protrusion and the fourth protrusion are parallel to the second direction,
the electrolytic cell further comprises a frame-shaped intermediate chamber frame that accommodates the cathode-side grid and the anode-side grid,
in the intermediate chamber frame, an inner wall section on one side in the second direction has a supply groove that extends in the third direction and communicates with an acceptance port of the intermediate chamber frame via which the electrolytic solution is accepted, and
in the intermediate chamber frame, an inner wall section on the other side in the second direction has a discharge groove that extends in the third direction and communicates with a discharge port of the intermediate chamber frame via which the electrolytic solution is discharged.

9. The electrolytic cell according to claim 8,
wherein an orifice is present in a channel that connects the discharge groove to the discharge port.

10. The electrolytic cell according to claim 1,
further comprising an intermediate chamber frame that is a frame-shaped chamber and has an interior partitioned in the second direction by a partition extending in a third direction perpendicular to the first and second directions so that accommodation spaces are arranged in the second direction,
wherein the accommodation spaces each accommodate the spacer.

11. The electrolytic cell according to claim 4,
wherein the first protrusion is formed of a plurality of first protrusions,
the third protrusion is formed of a plurality of third protrusions,
the first protrusions and the third protrusions are located in different positions in the third direction,
the electrolytic cell further comprises a frame-shaped intermediate chamber frame that accommodates the cathode-side grid and the anode-side grid, and in the intermediate chamber frame, an inner wall section on the one side in the second direction has a supply port via which the electrolytic solution is supplied.

* * * * *